(12) United States Patent
Lemieux

(10) Patent No.: US 10,822,054 B2
(45) Date of Patent: Nov. 3, 2020

(54) SIDE PANEL FOR A VEHICLE

(71) Applicant: BOMBARDIER RECREATIONAL PRODUCTS INC., Valcourt (CA)

(72) Inventor: Rene Lemieux, Granby (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 407 days.

(21) Appl. No.: 16/078,796

(22) PCT Filed: Mar. 30, 2016

(86) PCT No.: PCT/IB2016/051802
§ 371 (c)(1),
(2) Date: Aug. 22, 2018

(87) PCT Pub. No.: WO2017/144955
PCT Pub. Date: Aug. 31, 2017

(65) Prior Publication Data
US 2019/0047662 A1  Feb. 14, 2019

Related U.S. Application Data

(63) Continuation-in-part of application No. 14/631,722, filed on Feb. 25, 2015, now Pat. No. 9,346,508.
(Continued)

(51) Int. Cl.
*B62M 27/02* (2006.01)
(52) U.S. Cl.
CPC ....... *B62M 27/02* (2013.01); *B62M 2027/028* (2013.01)

(58) Field of Classification Search
CPC .................. B62M 27/02; B62M 2027/028
See application file for complete search history.

(56) References Cited

U.S. PATENT DOCUMENTS

| D487,233 S | 3/2004 | Cadotte et al. |
|---|---|---|
| D487,413 S | 3/2004 | Cadotte et al. |

(Continued)

FOREIGN PATENT DOCUMENTS

| CN | 101229817 A | 7/2008 |
|---|---|---|
| RU | 2480368 C2 | 4/2013 |

OTHER PUBLICATIONS

International Search Report of PCT/IB2016/051802, Blaine R. Copenheaver, dated Aug. 8, 2016.
(Continued)

*Primary Examiner* — Drew J Brown
(74) *Attorney, Agent, or Firm* — BCF LLP

(57) ABSTRACT

A side panel for a vehicle having a straddle seat. The side panel has an outer surface and is configured to be connected on a side of the vehicle at least in part 5 longitudinally forward of the straddle seat and vertically lower than the straddle seat. The outer surface defines a first leg area configured to accommodate at least a portion of a leg of a driver seated on the straddle seat in a first position, and a second leg area configured to accommodate at least a portion of the leg of the driver seated on the straddle seat in a second position. The second leg area is disposed at least in part 10 longitudinally forward of the first leg area when the side panel is connected on the vehicle. A vehicle having a left and right side panel is also disclosed.

15 Claims, 27 Drawing Sheets

Related U.S. Application Data

(60) Provisional application No. 62/298,043, filed on Feb. 22, 2016, provisional application No. 61/944,230, filed on Feb. 25, 2014.

(56) References Cited

U.S. PATENT DOCUMENTS

| | | | |
|---|---|---|---|
| D488,098 S | 4/2004 | Cadotte et al. | |
| D495,973 S | 9/2004 | Cadotte et al. | |
| D505,889 S | 6/2005 | Girouard et al. | |
| 6,923,284 B2 | 8/2005 | Bedard et al. | |
| D563,271 S | 3/2008 | Curthelet | |
| D571,256 S | 6/2008 | Curthelet | |
| D580,823 S | 11/2008 | Longpre | |
| D580,824 S | 11/2008 | Longpre et al. | |
| D583,281 S | 12/2008 | Longpre et al. | |
| D583,707 S | 12/2008 | Longpre et al. | |
| D587,168 S | 2/2009 | Longpre et al. | |
| D592,099 S | 5/2009 | Longpre et al. | |
| 7,802,644 B2 | 9/2010 | Brodeur et al. | |
| 8,012,050 B2 | 9/2011 | Aitcin et al. | |
| D670,602 S | 11/2012 | Lepine et al. | |
| D686,946 S | 7/2013 | Lepine et al. | |
| D717,209 S | 11/2014 | Lepine et al. | |
| 9,073,604 B2 | 7/2015 | Mallette et al. | |
| 9,174,702 B1 | 11/2015 | Gauthier et al. | |
| 9,180,763 B2 | 11/2015 | Fournier et al. | |
| 2001/0040063 A1 | 11/2001 | Wubbolts et al. | |
| 2003/0029659 A1* | 2/2003 | Etou | B62M 27/02 180/190 |
| 2003/0127265 A1 | 7/2003 | Watson et al. | |
| 2004/0188161 A1* | 9/2004 | Yatagai | B62M 27/02 180/190 |
| 2005/0034909 A1 | 2/2005 | Vaisanen | |
| 2005/0199431 A1 | 9/2005 | Hoi | |
| 2005/0205319 A1* | 9/2005 | Yatagai | B62M 27/02 180/190 |
| 2007/0034435 A1 | 2/2007 | Berg | |
| 2008/0173492 A1 | 7/2008 | Aitcin et al. | |
| 2008/0185202 A1* | 8/2008 | Maltais | B62M 27/02 180/190 |
| 2009/0152036 A1 | 6/2009 | Okada et al. | |
| 2011/0094817 A1 | 4/2011 | Nagao et al. | |
| 2011/0278083 A1 | 11/2011 | Yoshihara et al. | |
| 2015/0197149 A1* | 7/2015 | Hedlund | B60K 13/04 180/309 |
| 2015/0197313 A1* | 7/2015 | Vistad | B62M 27/02 180/182 |
| 2017/0030454 A1* | 2/2017 | Aitcin | F16H 9/12 |
| 2018/0141616 A1* | 5/2018 | Pard | B62M 27/02 |
| 2018/0195607 A1* | 7/2018 | Roland | F16H 61/66272 |
| 2019/0063582 A1* | 2/2019 | Aitcin | B62M 9/08 |

OTHER PUBLICATIONS

English translation of Abstract of RU2480368C2 retrieved from https://worldwide.espacenet.com/ on Oct. 8, 2019.

English translation of Abstract of CN101229817A retrieved from https://worldwide.espacenet.com/ on Jan. 6, 2020.

* cited by examiner

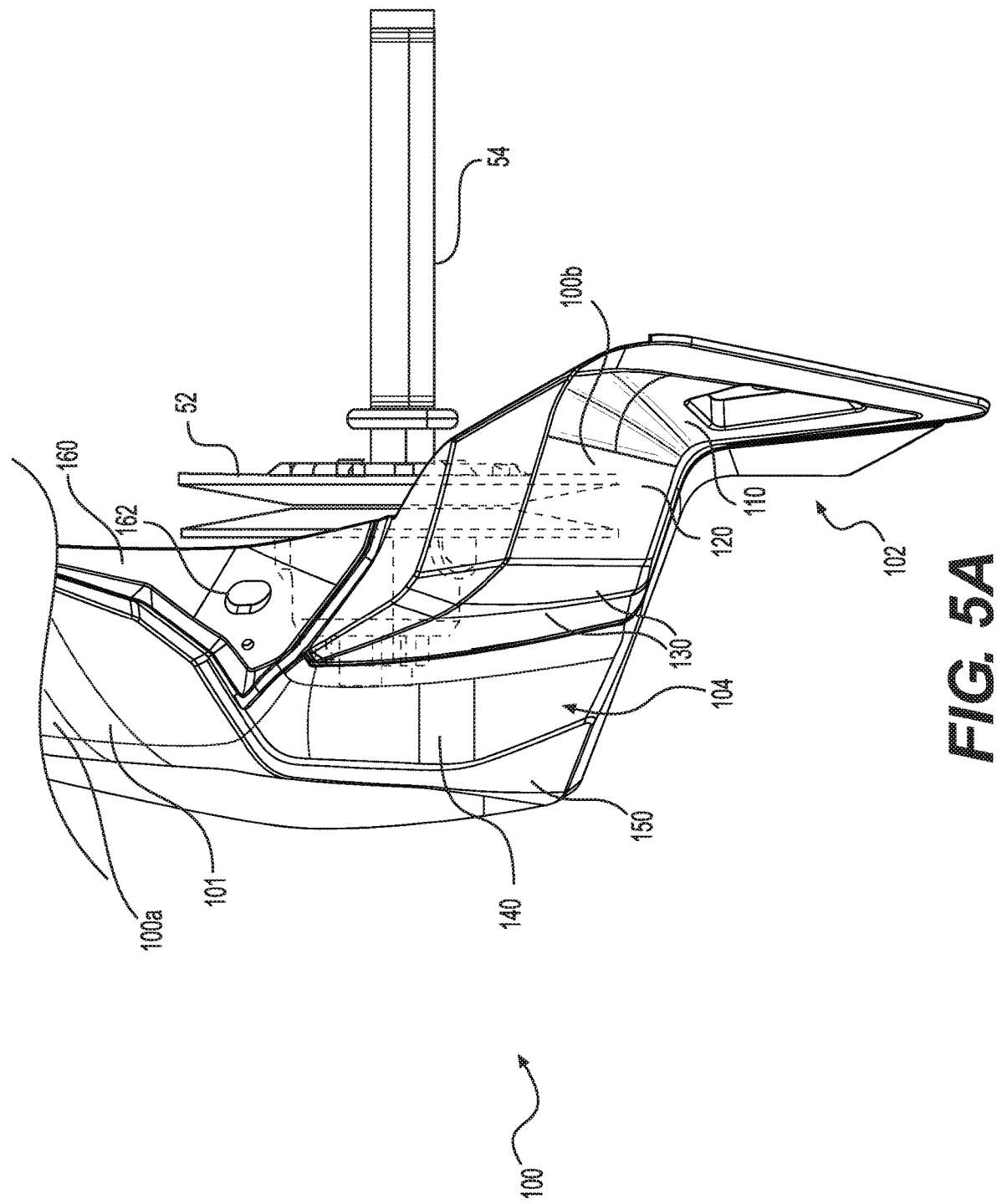

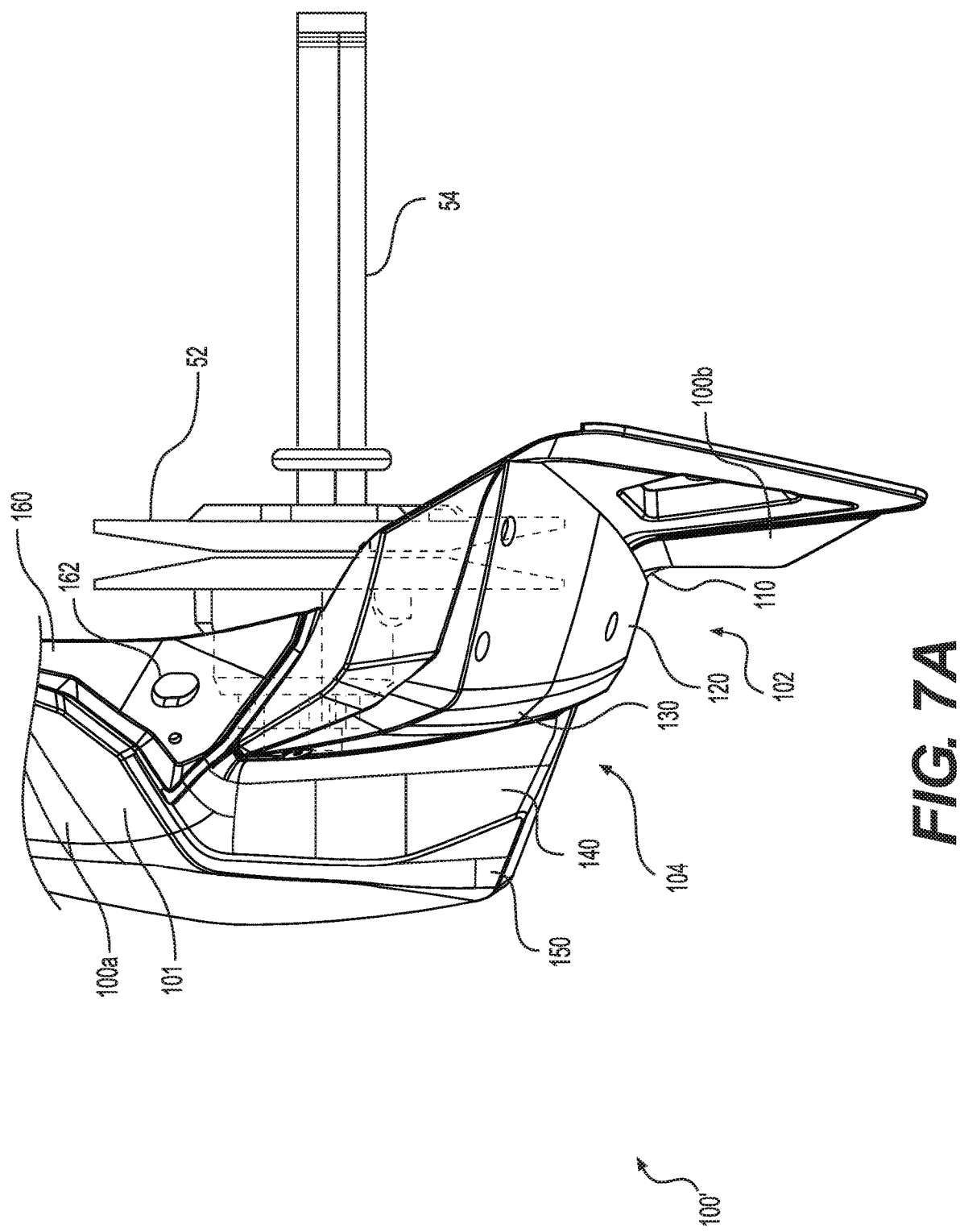

SIDE PANEL FOR A VEHICLE

CROSS-REFERENCE

The present application claims priority to U.S. Provisional Patent Application No. 62/298,043 filed on Feb. 22, 2016. For the purposes of the United States of America, this application is a continuation-in-part of U.S. patent application Ser. No. 14/631,722 filed on Feb. 25, 2015 which claims priority to U.S. Provisional Patent Application No. 61/944,230 filed on Feb. 25, 2014. The entirety of all of which is incorporated herein by reference.

TECHNICAL FIELD

The present technology relates to side panels for vehicles.

BACKGROUND

When driving a straddle-seat vehicle such as a snowmobile, the driver is typically positioned upright on the seat when the vehicle is moving in a straight-ahead direction. When turning however, the driver may lean towards the inside of the turn in addition to turning the handlebar to that side. Typically, the driver leans further for executing sharper and/or faster turns than when gently turning the vehicle. It is therefore desirable, especially in high-performance and sport vehicles, to configure the vehicle such that the driver is positioned comfortably and firmly thereon both while driving in a straight-ahead orientation and when executing turns.

SUMMARY

One object of the present is to ameliorate at least some of the inconveniences of the prior art.

In accordance with one aspect of the present technology, there is provided a side panel for a vehicle having a straddle seat. The side panel has an outer surface and is configured to be connected on a side of the vehicle at least in part longitudinally forward of the straddle seat and vertically lower than the straddle seat. The outer surface defines a first leg area configured to accommodate at least a portion of a leg of a driver seated on the straddle seat in a first position, and a second leg area configured to accommodate at least a portion of the leg of the driver seated on the straddle seat in a second position. The second leg area is disposed at least in part longitudinally forward of the first leg area when the side panel is connected on the vehicle. A vehicle having a left and right side panel is also disclosed.

In some implementations, the second leg area is disposed at least in part laterally outwardly of the first leg area when the side panel is connected on the vehicle.

In some implementations, the outer surface includes a first laterally extending surface and a second laterally extending surface disposed at least in part longitudinally forward of the first laterally extending surface when the side panel is connected on the vehicle. Each of the first and second laterally extending surfaces extend generally laterally and vertically when the side panel is connected on the vehicle. The first leg area is defined at least in part by the first laterally extending surface, and the second leg area is defined at least in part by the second laterally extending surface.

In some implementations, the second laterally extending surface extends laterally outwardly of the first laterally extending surface.

In some implementations, the outer surface includes a longitudinally extending surface extending generally longitudinally and vertically when the side panel is connected on the vehicle, the longitudinally extending surface being disposed at least in part longitudinally rearward of the second laterally extending surface and longitudinally forward of the first laterally extending surface when the side panel is connected on the vehicle.

In some implementations, a longitudinal direction width of the longitudinally extending surface increases continuously from its lower end to its upper end.

In some implementations, the outer surface extends continuously from the first laterally extending surface to the longitudinally extending surface.

In some implementations, the outer surface further includes a longitudinally extending surface extending generally longitudinally and vertically when the side panel is connected on the vehicle, the laterally extending surface being disposed at least in part longitudinally rearward of the first laterally extending surface when the side panel is connected on the vehicle. In another aspect, the longitudinally extending surface is a first longitudinally extending surface and further comprising a second longitudinally extending surface extending generally longitudinally and vertically when the side panel is connected on the vehicle, the second longitudinally extending surface being disposed at least in part longitudinally rearward of the second laterally extending surface and longitudinally forward of the first laterally extending surface when the side panel is connected on the vehicle.

In accordance with another aspect of the present technology, there is provided a vehicle having a frame, a motor operatively connected to the frame, and a ground engaging member operatively connected to the motor and the frame. The ground engaging member is one of: an endless track, and a wheel. A straddle seat is connected to the frame and configured to accommodate at least a driver of the vehicle. A left side panel is connected on a left side of the frame and a right side panel is connected on a right side of the frame. Each of the left and right side panels is disposed at least in part longitudinally forward of and vertically lower than the straddle seat. The left side panel defines a rear left leg area and a front left leg area disposed longitudinally forward of the rear left leg area, the rear left leg area selectively accommodates a portion of a left leg of the driver in a first left leg position and the front left leg area selectively accommodating a portion of the left leg of the driver in a second left leg position. A right side panel defines a rear right leg area and a front right leg area disposed longitudinally forward of the rear right leg area. The rear right leg area selectively accommodates a portion of a right leg of the driver in a first right leg position and the front right leg area selectively accommodates a portion of the right leg of the driver in a second right leg position.

In accordance with another aspect of the present technology, there is provided a vehicle comprising a frame, a motor operatively connected to the frame, a ground engaging member operatively connected to the motor and the frame, the ground engaging member being one of: an endless track, and a wheel, a driven pulley operatively connecting the motor to the ground engaging member, a straddle seat connected to the frame and configured to accommodate at least a driver of the vehicle, a left side panel connected on a left side of the frame and a right side panel connected on a right side of the frame, each of the left and right side panels being disposed at least in part longitudinally forward of and vertically lower than the straddle seat. At least one of the left side panel and the right side panel defines a space for receiving the driven pulley therein, the at least one of the left side panel and the right side panel comprising a front longitudinal surface extending generally longitudinally on an exterior side of the driven pulley, a rear lateral surface extending generally upwardly and forwardly from behind the driven pulley to above the driven pulley, the front longitudinal surface and the rear lateral surface defining the space for receiving the driven pulley therein, and a front lateral surface extending laterally outwardly of the rear lateral surface.

In some implementations, the at least one of the left side panel and the right side panel further comprises an inner portion disposed generally above the driven pulley.

In some implementations, the at least one of the left side panel and the right side panel further comprises a rear longitudinal surface extending generally rearward from the rear lateral surfaces.

In some implementations, the left side panel further defines a rear left leg area and a front left leg area disposed longitudinally forward of the rear left leg area, the rear left leg area selectively accommodating a portion of a left leg of the driver in a first left leg position and the front left leg area selectively accommodating a portion of the left leg of the driver in a second left leg position and the right side panel defines a rear right leg area and a front right leg area disposed longitudinally forward of the rear right leg area, the rear right leg area selectively accommodating a portion of a right leg of the driver in a first right leg position and the front right leg area selectively accommodating a portion of the right leg of the driver in a second right leg position.

For purposes of this application, terms related to spatial orientation such as forwardly, rearwardly, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle, such as the side panel for example, should be understood as they would be understood when these components or sub-assemblies are mounted to the vehicle. Definitions and explanations of terms provided herein take precedence over definitions and explanations of those terms in any of the documents incorporated herein by reference.

Implementations of the present technology each have at least one of the above-mentioned aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 2B is a top plan view of the portion of the snowmobile of

FIG. 2A also showing a left side panel and a driven pulley and countershaft of a continuously variable transmission;

FIG. 5A is a close-up top plan view of a portion of the left side panel of FIG. 2B with the driven pulley and countershaft being shown partially in dotted lines;

FIG. 7A is a close-up top plan view of a portion of the left side panel of FIG. 6 with the driven pulley and countershaft being shown partially in dotted lines;

DETAILED DESCRIPTION

Although the present technology is described below with respect to a snowmobile, it is contemplated that aspects could be applied to other straddle-seat vehicles, such as motorcycles and the like.

Figure 1:
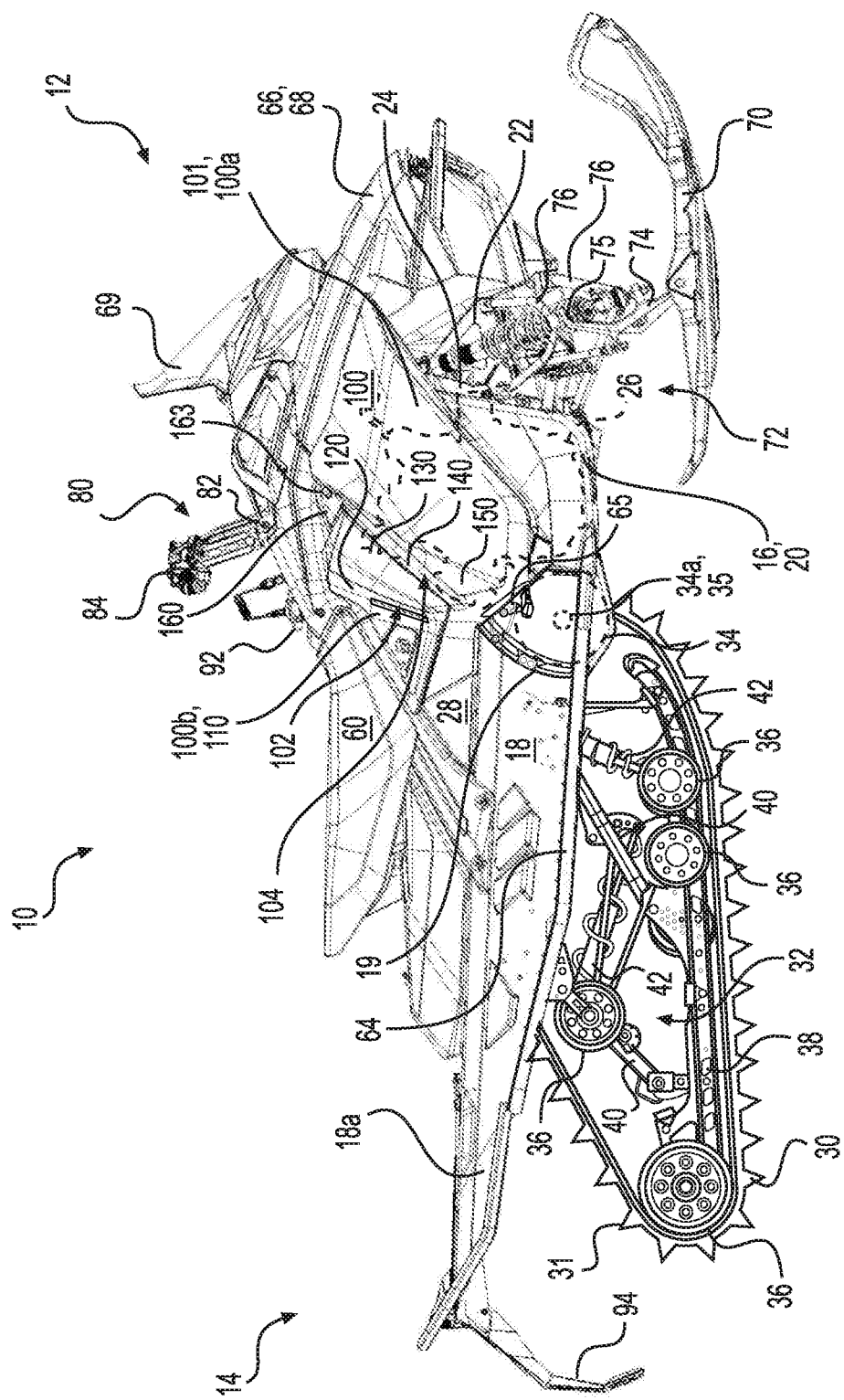
FIG. 1 is a right side elevation view of a snowmobile.

With reference to FIG. 1, a snowmobile 10 includes a front end 12 and a rear end 14 which are defined consistently with a travel direction of the vehicle 10. The snowmobile 10 includes a vehicle body in the form of a frame or chassis 16 which includes a rear tunnel 18, an engine support structure 20, a front suspension module 22 and an upper structure 24. The tunnel 18 is formed from sheet metal parts assembled to form an inverted U-shape when viewed from the forward or rearward end 12, 14. The inverted U-shaped tunnel 18 has a left side portion 18a and a right side portion 18a. A vertically extending longitudinal plane 13 (FIG. 2B) passing through a lateral center of the snowmobile 10 is referred to herein as the longitudinal centerplane 13 of the snowmobile 10.

A motor 26 (schematically illustrated in FIGS. 1 and 2B) is carried in an engine compartment defined by the engine support structure 20 of the frame 16. In the illustrated implementation, the motor 26 is an internal combustion engine, but it is contemplated that it could be other than an internal combustion engine, for example, and electric motor or a hybrid. A fuel tank 28, supported above the tunnel 18, supplies fuel to the engine 26 for its operation.

Figure 2A:
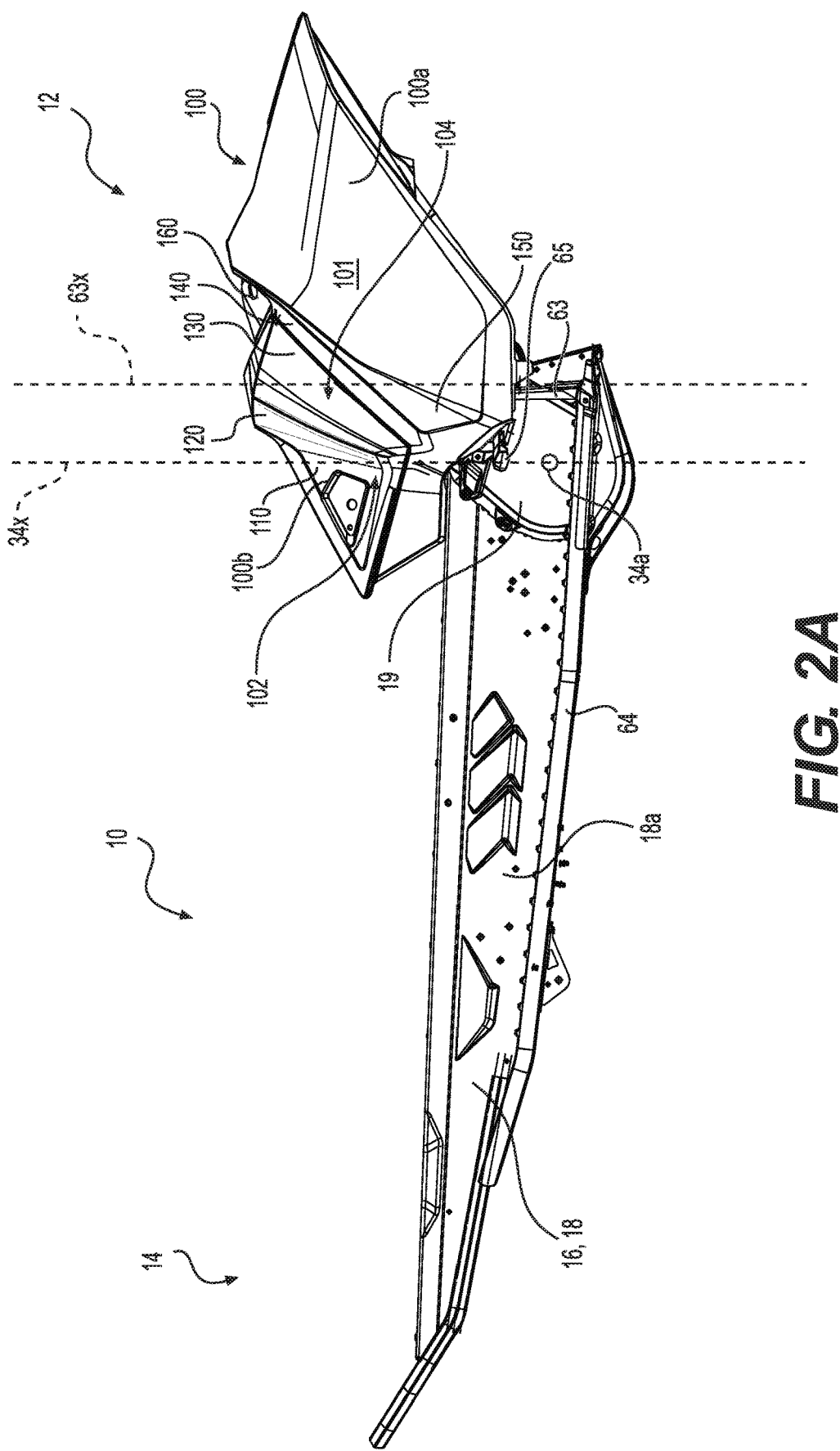
FIG. 2A is a right side elevation view of a portion of the snowmobile of FIG. 1 including a tunnel having mounted thereto a right side panel.
Figure 2B:
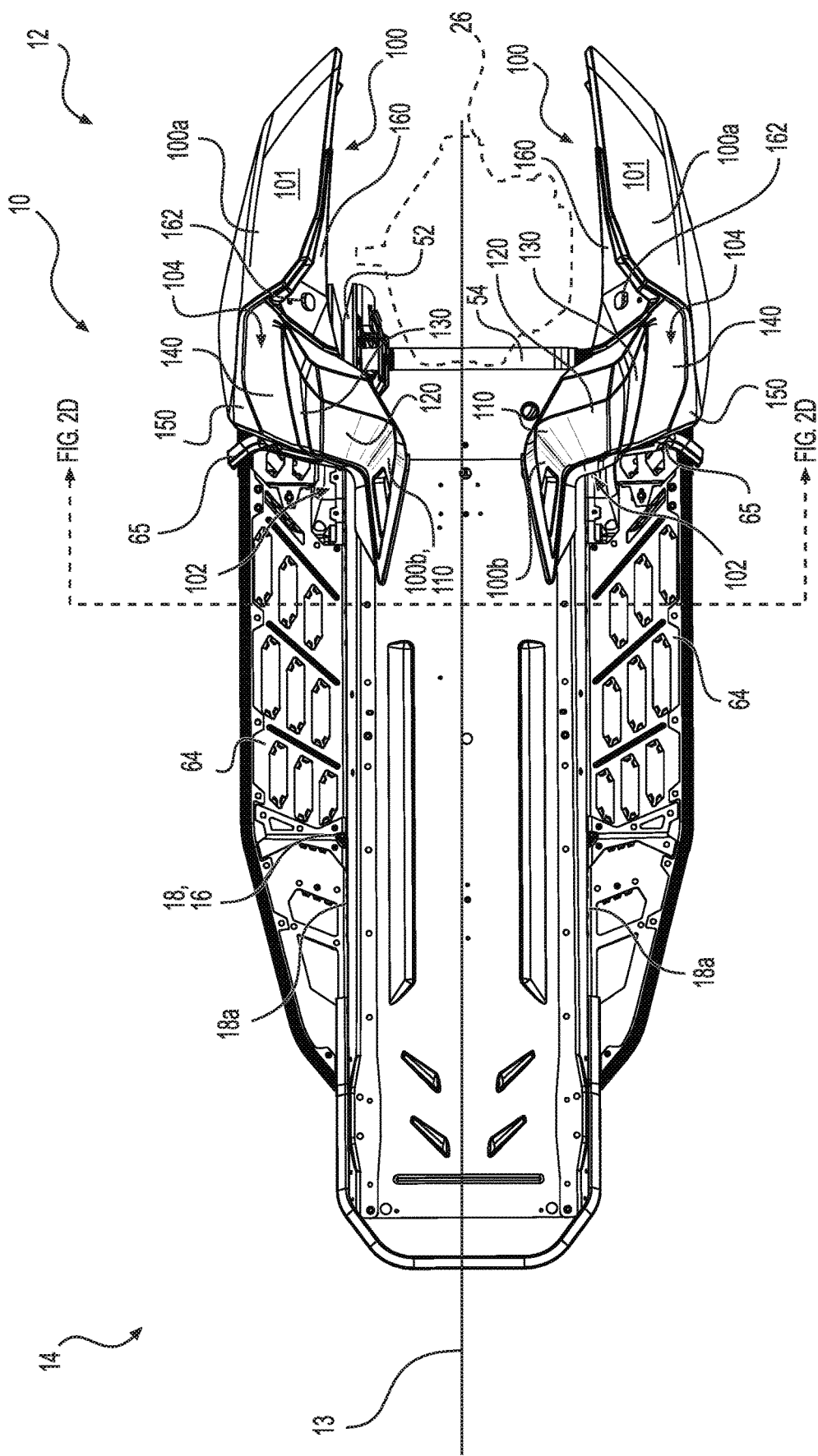

An endless drive track 30 is positioned generally under the tunnel 18, and operatively connected to the engine 26 via a drivetrain including a belt transmission system (a driven pulley 52 and a countershaft 54 of the belt transmission system being shown in FIG. 2B) and a reduction gear assembly (not shown). The endless drive track 30 is driven to run about a rear suspension assembly 32 connected to the frame 16 for propulsion of the snowmobile 10. The endless drive track 30 has a plurality of lugs 31 extending from an outer surface thereof to provide traction to the track 30. Further details regarding the snowmobile drivetrain can be found in U.S. Pat. No. 8,012,050 issued on Sep. 6, 2011, the entirety of which is incorporated herein by reference.

The rear suspension assembly 32 includes a pair of drive sprockets 34 (shown schematically) mounted on a drive axle 35 (shown schematically), one or more idler wheels 36 and a pair of slide rails 38 in sliding contact with the endless drive track 30. The drive axle 35 having the drive sprockets 34 mounted thereon defines a drive axle axis 34a. The slide rails 38 are attached to the tunnel 18 by front and rear suspension arms 40 and one or more shock absorbers 42 which include a coil spring surrounding the individual shock absorbers 42. It is contemplated that the snowmobile 10 could be provided with a different implementation of a rear suspension assembly 32 than the one shown herein.

Figure 2C:
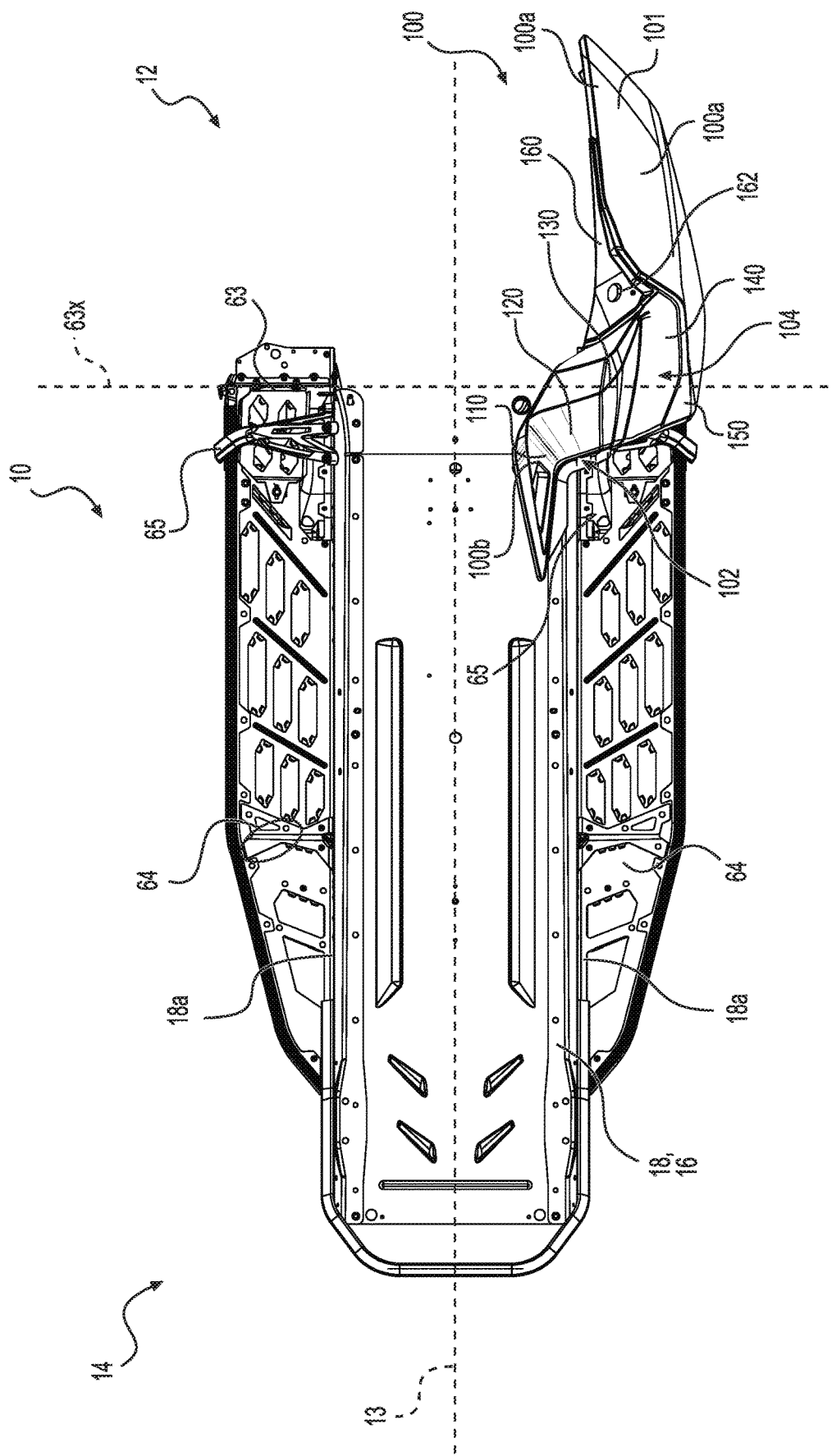
FIG. 2C is a top plan view of the portion of the snowmobile of FIG. 2B with the left side panel, the driven pulley and the countershaft removed for clarity.
Figure 2D:
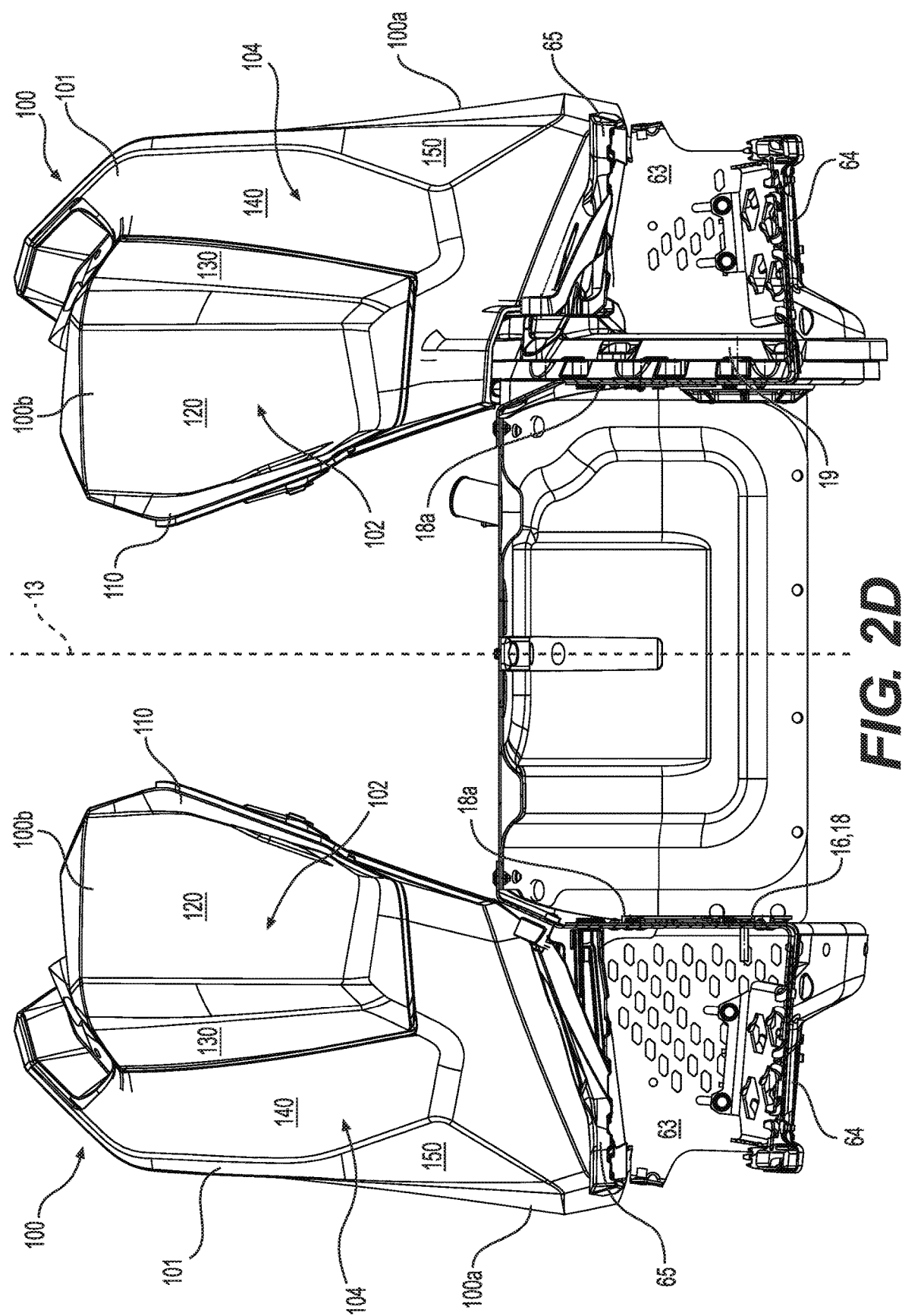
FIG. 2D is a cross-sectional view taken along the line 2D-2D of FIG. 2B.

A straddle-type seat 60 is positioned atop the fuel tank 28. A fuel tank fill opening covered by a cap 92 is disposed on the upper surface of the fuel tank 28 in front of the seat 60. It is contemplated that the fuel tank fill opening 92 could be disposed elsewhere on the fuel tank 28. The seat 60 is adapted to accommodate a driver of the snowmobile 10. The seat 60 can also be configured to accommodate a passenger. A footrest 64 is positioned on each side of the snowmobile 10 below the seat 60 to accommodate the driver's feet. Each of the left and right footrests 64 extends generally laterally outwardly from the corresponding left and right side portion of the tunnel 18. In the illustrated implementation, each side portion 18a of the tunnel 18 is bent laterally outwardly at its bottom edge to form the corresponding footrest 64. It is however contemplated that the footrest 64 could not be formed integrally with the tunnel 18 but could be formed separately and mounted thereto. A footstop 63 (best seen in FIG. 2C) is connected to the front end of each footrest 64. In the illustrated implementation, each footstop 63 is in the form of a wall-like structure extending generally laterally and vertically upwardly from the corresponding footrest 64 and thereby prevents the driver's foot resting on the footrest 64 from sliding forward past the front end of the footrest 64. It is contemplated that one or both of the footstops 63 could be configured differently than as shown herein. It is contemplated that one or both of the footstops 63 could be formed integrally with the corresponding footrest 64 and/or the tunnel 18. A toe hold 65 is disposed above the front portion of each footrest 64 and longitudinally rearwardly of the corresponding footstop 63. Each toe hold 65 is in the form of a cantilever-like structure being connected at its laterally inner end and extending laterally outwardly therefrom. The right toe hold 65 is mounted to a chaincase 19 mounted to the right side portion 18a of the tunnel 18. The chaincase 19 extends over the reduction gear assembly (not shown) of the snowmobile drivetrain. As can be seen in FIG. 2B, the left toe hold 65 is mounted to the left side portion 18a of the tunnel 18 and extends laterally outwardly therefrom. As can be seen in FIGS. 2B to 2D, the outer end of each toe hold 65 is disposed laterally outwardly of the outer edge of the portion of the corresponding footrest 64 disposed therebelow. It is contemplated that one or both of the toe holds 65 could be configured differently than as shown herein. It is contemplated that one or both of the toe holds 65 could be formed integrally with the corresponding footrest 64 and/or the tunnel 18 and/or the corresponding footstop 63.

At the front end 12 of the snowmobile 10, fairings 66 enclose the engine 26, the continuous variable transmission system and other components of the powerpack such as the air intake system. The fairings 66 include a hood 68 which can be opened to allow access to the engine 26 and other internal components of the snowmobile 10 from the top and the front which may be required, for example, for inspection or maintenance of the engine 26 and/or powerpack. The fairings 66 also include a left side panel 100 (FIG. 2B) extending on a left side of the snowmobile 10 and a right side panel 100 extending on a right side of the snowmobile 10. The engine 26 and the transmission system are disposed between the left and right side panels 100. The left and right side panels 100 are both removably connected to the frame 16 and/or to other fairing panels and can be removed to access the internal components from the corresponding lateral side. In the illustrated implementation, the panels 100 are hinged for connection to the frame 16 and/or other fairing panels 66. It is contemplated that the panels 100 could be removably connected to the frame 16 and/or other fairing panels 66 by other kinds of removable connections, such as a latch, a clip, or the like. The side panels 100 will be described below in further detail. A windshield 69 connected to the fairings 66 acts as a wind screen to lessen the force of the air on the rider while the snowmobile 10 is moving.

Two skis 70 positioned at the forward end 12 of the snowmobile 10 are attached to the front suspension module 22 of the frame 16 through a front suspension assembly 72. The front suspension module 22 is connected to the front end of the engine support structure 24. The front suspension assembly 72 includes ski legs 74, shock absorbers 75, supporting arms 76 and ball joints (not shown) for operatively connecting to the respective ski leg 74, supporting arms 76 and a steering column 82.

A steering assembly 80, including the steering column 82 and a handlebar 84, is provided generally forward of the seat 60. The steering column 82 is rotatably connected to the frame 16. The lower end of the steering column 82 is connected to the ski legs 74 via a steering rod (not shown). The handlebar 84 is attached to the upper end of the steering column 82. The handlebar 84 is positioned in front of the seat 60. The handlebar 84 is used to rotate the steering column 82, and thereby the skis 70, in order to steer the vehicle 10. A throttle operator (not shown) in the form of a thumb-actuated throttle lever is mounted to the right side of the handlebar 84. Other types of throttle operators, such as a finger-actuated throttle lever and a twist grip, are also contemplated. A brake actuator (not indicated), in the form of a hand brake lever, is provided on the left side of the handlebar 84 for braking the snowmobile 10 in a known manner. It is contemplated that the windshield 69 could be connected directly to the handlebar 84.

At the rear end of the snowmobile 10, a snow flap 94 extends downward from the rear end of the tunnel 18. The snow flap 94 protects against dirt that can be projected upward from the drive track 30 when the snowmobile 10 is being driven. It is contemplated that the snow flap 94 could be omitted.

The snowmobile 10 includes other components such as a display cluster, an exhaust system, an air intake system, and the like. As it is believed that these components would be readily recognized by one of ordinary skill in the art, further explanation and description of these components will not be provided herein.

The right side panel 100 will now be described with reference to FIGS. 2A to 3C.

With reference to FIGS. 2A to 2C, the right side panel 100 is disposed on a right side of the longitudinal centerplane 13 (FIG. 2B). The right side panel 100 extends in part upwards from the tunnel 18, in part forwardly therefrom, and in part on a right side of the right side portion 18a thereof. The right side panel 100 has a front portion 100a and a rear portion 100b. A bottom edge of the right side panel 100 is disposed on a right side of the right side portion 18a of the tunnel 18 and vertically between the upper tunnel surface and the footrest 64. The right toe hold 65 is disposed in a space defined by the bottom edge of the rear portion 100b of the right side panel 100 and the right footrest 64. The front portion 100a extends forwardly and upwardly from the bottom edge of the right side panel 100. The front portion 100a extends longitudinally forward of the right footrest 64, the right toe hold 65 and the front of the tunnel 18. The rear portion 100b of the right side panel 100 extends rearwardly and upwardly from the bottom edge, above the right toe hold 65 on a right side of the right tunnel portion 18a. A portion of the rear portion 100b extends above the tunnel 18 and on a right side of the fuel tank 28. A portion of the lower edge of the rear portion 100b is disposed on the upper surface of the tunnel 18. In the illustrated implementation, the right side panel 100 is formed as a single integral panel. It is contemplated that the right side panel 100 could have a plurality of panels independently fixed to the snowmobile 10 and disposed next to each other or connected together.

With reference to FIGS. 2A to 3C, the right side panel 100 has an outer surface 101 facing laterally outwardly away from the longitudinal centerplane 13, and from the fuel tank 28, the engine 26 and other internal components of the snowmobile 10. The outer surface 101 has a rear longitudinally extending surface portion 110, a rear laterally extending surface portion 120, a front longitudinally extending surface portion 130, a front laterally extending surface portion 140, and a front outer surface portion 150 which will be described below in further detail. For convenience, the above-mentioned surface portions 110, 120, 130, 140, 150 are referred to respectively as the rear longitudinal surface 110, the rear lateral surface 120, the front longitudinal surface 130, the front lateral surface 140, and the front outer surface 150. Each of the rear lateral surface 120 and the front lateral surface 140 extends in the lateral as well as longitudinal directions. However, these surfaces 120, 140 are referred to as lateral surfaces 120, 140 since their contribution to the overall width of the rear portion 100b of the side panel 100 is greater than that of the longitudinal surfaces 110, 130. Each of rear longitudinal surface 110 and the front longitudinal surface 130 extends in the longitudinal and the lateral directions but much less than in the lateral direction than in the longitudinal direction as can be seen in the Figures.

With reference to FIGS. 2A to 3C, the rear longitudinal surface 110 extends generally vertically and longitudinally on a right side of the fuel tank 28. The fuel tank fill opening and cap 92 located on the upper surface of the fuel tank 28 is disposed so as to be aligned in the longitudinal direction with the front portion of the rear longitudinal surface 110. A vertical plane 34x containing the drive axle axis 34a intersects the rear longitudinal surface 110. The rear longitudinal surface 110 is disposed above the right side portion 18a and the right edge of the upper surface of the tunnel 18 as can be seen in FIG. 2B.

With reference to FIGS. 2A to 3C, the rear lateral surface 120 extends laterally outwardly from the front end of the rear longitudinal surface 110. The rear lateral surface 120 slopes gently forwardly from its lower end to its upper end. The rear lateral surface 120 has widths 122, 124 (i.e. width measured in the direction normal to the longitudinal centerplane 13). The width 122 of the lower portion of the rear lateral surface 120 is smaller than the width 124 of the upper portion thereof. In the lower portion, the width 122 increases continuously in an upward direction. In the upper portion the width 124 is generally constant as can be seen best in FIG. 3C. It is contemplated that the lateral direction width 122, 124 of the rear laterally extending surface 120, or a part thereof, could decrease in an upward direction, or remain constant. The outer edge of the rear lateral surface 120 is disposed on a right side of the tunnel 18 above the footrest 64 as can be seen in FIG. 2D. As can be seen in FIG. 2A, the lower end of the rear lateral surface 120 is disposed longitudinally forward of the vertical plane 34x containing the drive axle axis 34a and is generally longitudinally aligned with the toe hold 65. The upper portion of the rear lateral surface 120 is disposed longitudinally forwardly of the toe hold 65.

As can be seen in FIG. 2A, the rear lateral and longitudinal surfaces 120, 110 are disposed longitudinally rearward of the footstop 63. The rear longitudinal surface 110 and the rear lateral surface 120 define a rear right leg area 102 discussed below with reference to FIG. 4A. The rear longitudinal surface 110 overlies a portion of the snowmobile 10, which could include, but is not limited to, the fuel tank 28. In some implementations, the rear longitudinal surface 110 could be omitted and the rear right leg area 102 would be defined by the rear lateral surface 120 and the portion of the snowmobile. In some implementations, the rear right leg area 102 could be defined by the rear lateral surface 120 and the fuel tank 28. In such implementations with the rear longitudinal surface 110 omitted, the right side panel 100 would have a rear edge 109, as illustrated by the dashed line 109 in FIG. 3A.

With reference to FIGS. 2A to 3C, the front longitudinal surface 130 extends generally longitudinally and forwardly from the outer edge of the rear lateral surface 120. The front longitudinal surface 130 is aligned in the lateral direction with the footrest 64 as can be seen in FIG. 2B. The front end of the front longitudinal surface 130 extends slightly laterally outwardly of the rear end thereof (connected to the rear lateral surface 120). As can be seen in FIG. 3A, the longitudinal surface 130 has a length 132, 134 (measured in a longitudinal direction) that increases continuously from the lower portion (length 132) to the upper portion (length 134).

With reference to FIGS. 2A to 3C, the front lateral surface 140 extends laterally outwardly from the front end of the front longitudinal surface 130. The front lateral surface 140 is thus disposed laterally outwardly of the rear lateral surface 120 as can be seen in FIG. 2B. The width 144 (measured in the direction normal to the longitudinal centerplane 13) of the upper portion of the front lateral surface 140 is generally the same as the width of the lower portion 142. The upper portion width 144 of the front lateral surface 140 is smaller than the width 124 of the upper portion of the rear lateral surface 120. It is however contemplated that the lateral direction widths 142, 144 could be different than as shown herein. It is also contemplated that the lateral direction width of the front lateral surface 140, or a part thereof, could increase in an upward direction, or remain constant. As can be seen when viewed from a side as in FIGS. 2A and 3A, the front lateral surface 140 is also angled forwardly from its lower end toward its upper end. The front lateral surface 140 is angled further forwardly and away from a vertical plane (such as the plane 34*x*) extending perpendicular to the longitudinal centerplane 13 than the rear lateral surface 120. As can be seen in FIG. 2A, the lower end of the front lateral surface 140 is longitudinally closer to the lower end of the rear lateral surface 120 than the upper end of the front lateral surface 140 is to the upper end of the rear lateral surface 120. A vertical plane 63*x* extending perpendicular to the longitudinal centerline 13 and containing the footstop 63 intersects the front lateral and longitudinal surfaces 140, 130. The front longitudinal surface 130 and the front lateral surface 140 define a front right leg area 104 discussed below with reference to FIGS. 4B and 4D.

With reference to FIGS. 2A to 3C, the front outer surface 150 extends laterally outwardly and forwardly from the front lateral surface 140 to the front portion 100*a* of the right side panel 100. The front outer surface 150 has a generally triangular lower portion connected to a narrow strip forming the front upper portion. As can be seen in FIG. 2A, the triangular lower portion of the front outer surface 150 extends vertically lower than the lower end of the front lateral surface 140. As can be seen in FIG. 2A, the triangular lower portion of the front outer surface 150 extends vertically lower than the upper surface of the tunnel 18. As can be seen in FIG. 2B, in the illustrated implementation, this triangular lower portion of the front outer surface 150 is disposed above the outer edge of the front portion of the footrest 64. The triangular portion of the front outer surface 150 is disposed longitudinally forward of an outer portion of the toe hold 65. The outer portion of the toe hold 65 extends rearwardly in a laterally outward direction.

With reference to FIGS. 2B, 2C, 3B and 3C, the front portion 100*a* of the right side panel 100 will now be described briefly. In the front portion 100*a*, as can be seen best in FIGS. 2B and 2D, a portion of the outer surface 101 extends laterally outwardly and forwardly from the right end of the front outer surface 150 around a portion of the right side of the engine 26. It is however contemplated that the right side panel 100 could extend further or less laterally outwardly than as shown herein. An upper portion of the outer surface 101 disposed vertically above and longitudinally forward of the upper ends of the front lateral and longitudinal surfaces 130 curves laterally inwardly as can be seen best in FIGS. 2B and 3B. The upper portion of the outer surface 101 in the front portion 110*a* extends above the engine 26. It is contemplated that the shape of the front portion 100*a* could be different than as shown herein.

Figure 3A:
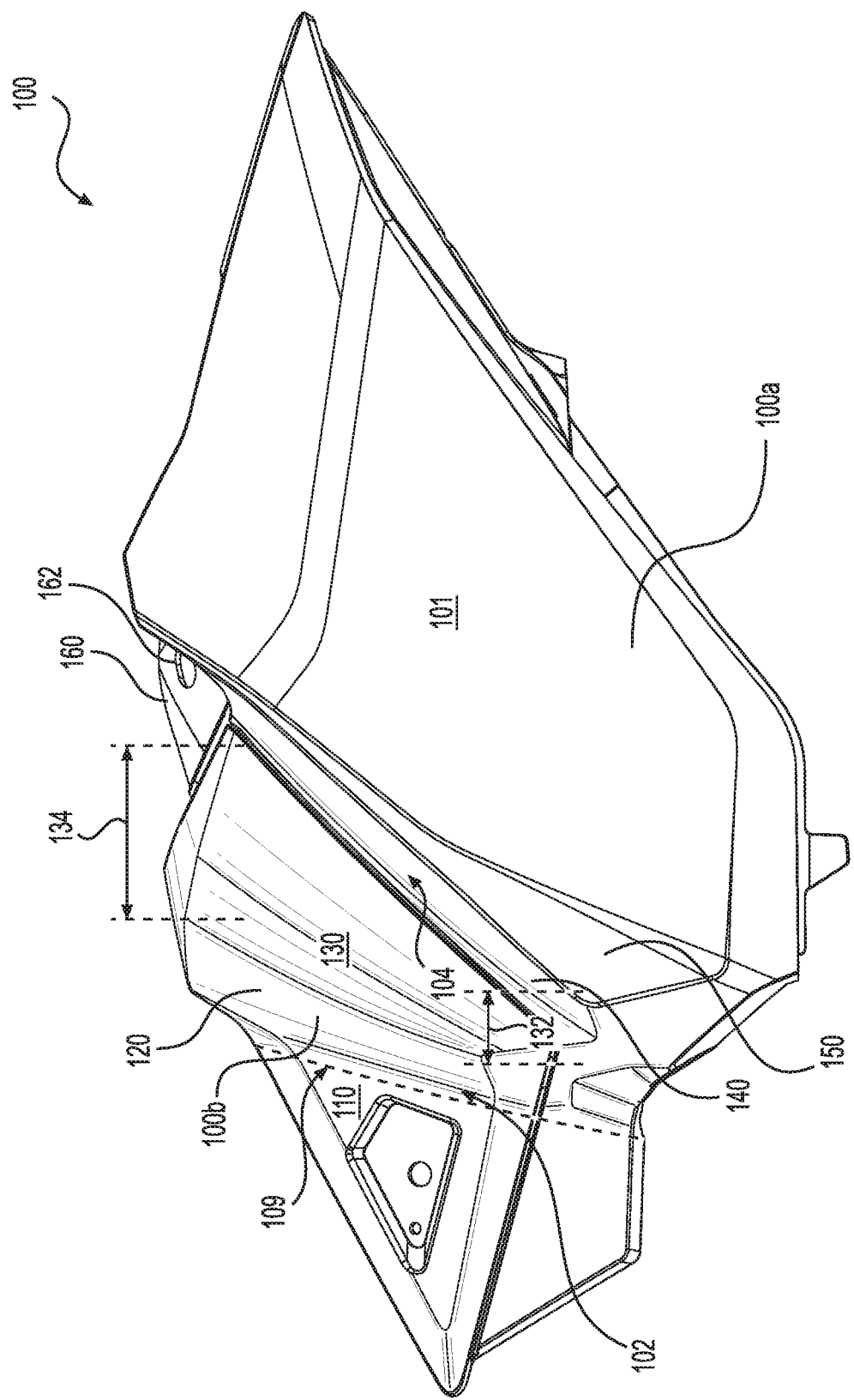
FIG. 3A is a right side elevation view of the right side panel of FIG. 2A shown in isolation.
Figure 3B:
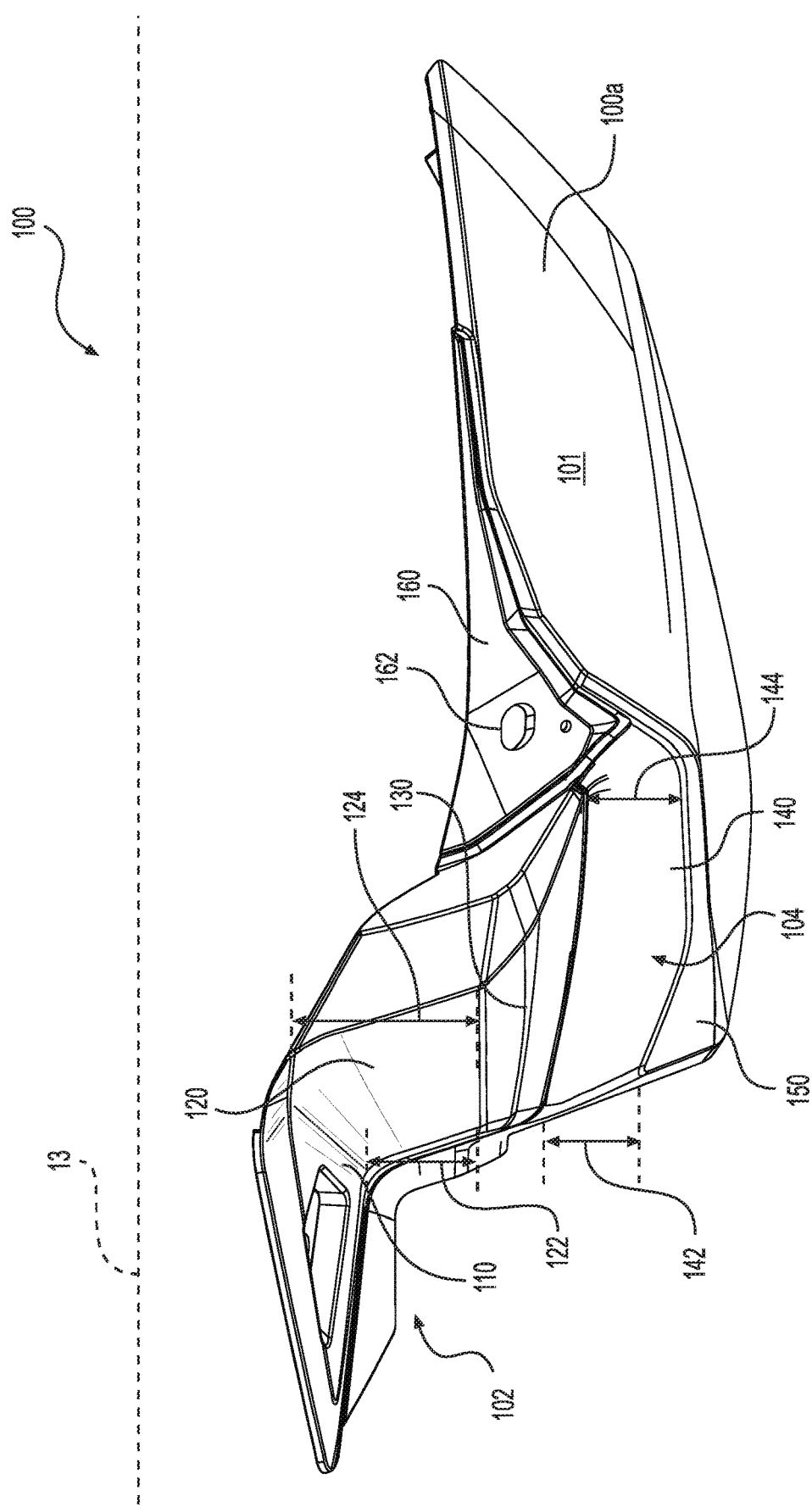
FIG. 3B is a top plan view of the right side panel of FIG. 3A.
Figure 3C:
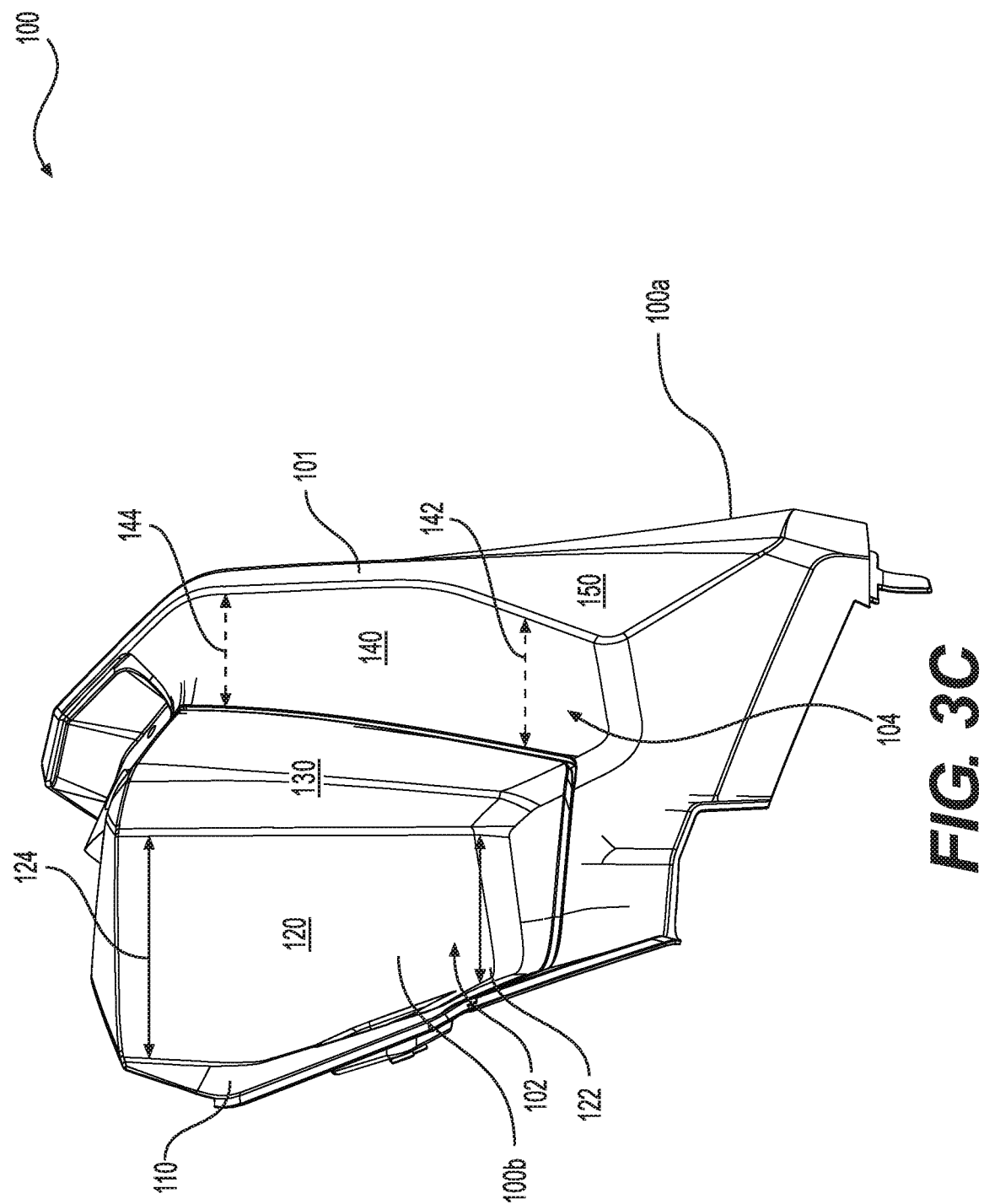
FIG. 3C is a rear elevation view of the right side panel of FIG. 3A.

With reference to FIG. 3B, an inner portion 160 of the right side panel 100 has an aperture 162 formed therein. The inner portion 160 is disposed forward of the front longitudinal surface 130 and the rear lateral surface 120, and laterally inwardly of the front lateral surface 140. The right side panel 100 is fastened by this inner portion 160 to another panel (seen in FIG. 1 but not indicated) of the fairings 66 by a bolt (163) inserted through the aperture 162. It is contemplated that other types of fasteners could be used or that the right side panel 100 could be fastened by press-fitting, snap-fitting, or the like. It is contemplated that the right side panel 100 could be fastened to the frame 16 of the snowmobile 10 via another panel of the fairings 66, via another component of the snowmobile 10, or directly to the frame 16.

Figure 5B:
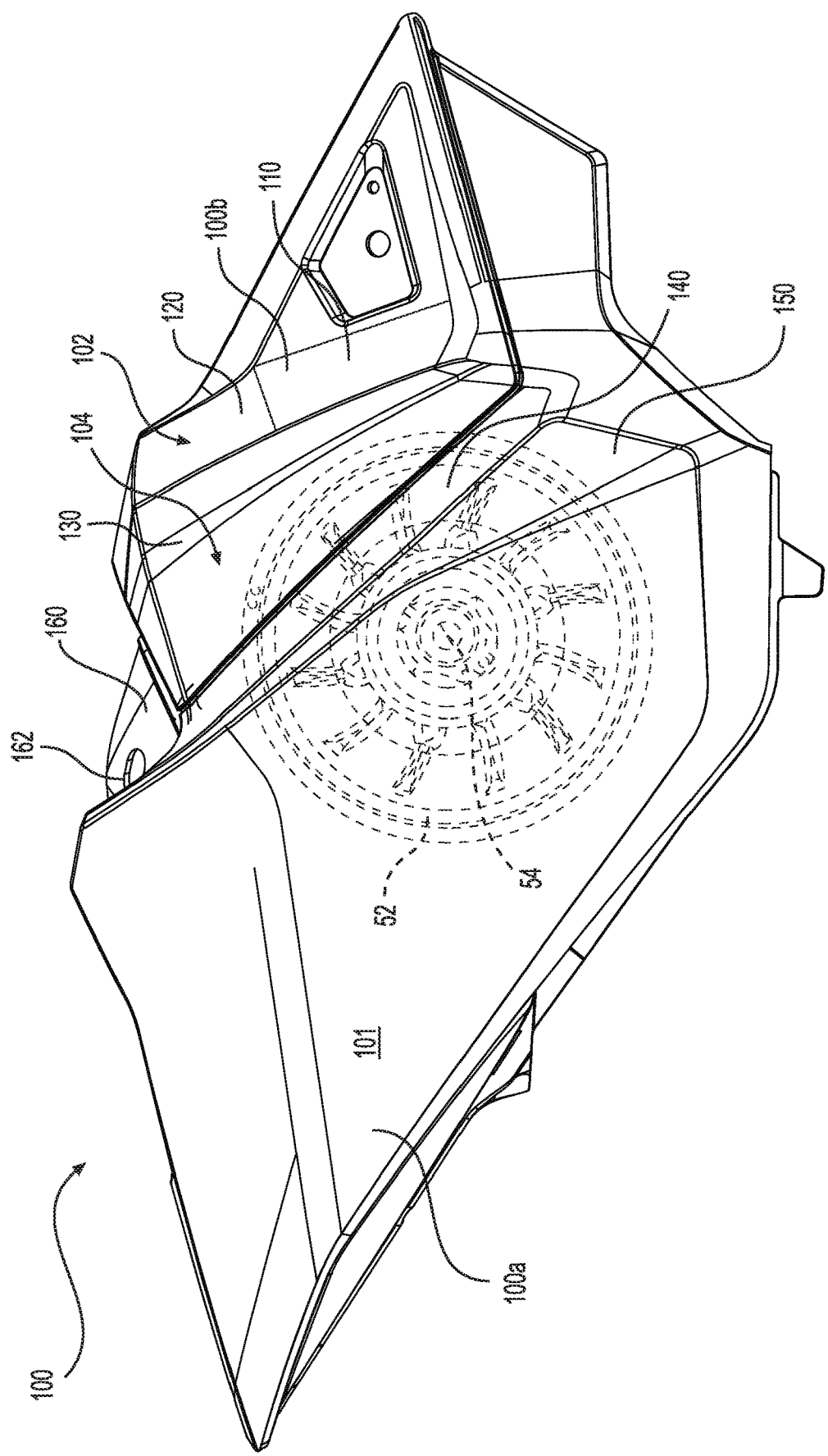
FIG. 5B is a left side elevation view of the left side panel, the driven pulley and countershaft of FIG. 5A.

With reference to FIGS. 2B, 5A and 5B, in the illustrated implementation, the left side panel 100 is nearly a mirror image of the right side panel 100 described above. As such, corresponding features of the left and right side panels 100 have been labeled with the same reference numbers and will not be described herein again in detail. It is contemplated that the left side panel 100 could be mirror image of the right side panel 100. As can be seen in FIGS. 2B, 5A and 5B, on the left side of the snowmobile 10, the driven pulley 52 is housed in a space formed by the front longitudinal surface 130 and the rear lateral surface 120 of the left side panel 100. The rear lateral surface 120 of the left side panel 100 extends upwardly and forwardly from behind the driven pulley 52 to above the drive pulley 52. The front longitudinal surface 130 extends generally longitudinally on a left side of the driven pulley 52. The inner portion 160 is disposed above the driven pulley 52.

It is contemplated that the drivetrain could be implemented in a mirror-image configuration. In such an implementation, the driven pulley 52 would be housed in a space formed by surfaces of the right side panel 100. It is also contemplated that the left side panel 100 could be different from the right side panel 100. For example, the rear longitudinal surface 110 could be omitted from the left side panel 100, or the front lateral surface 140 of the left side panel 100 could be different from the corresponding front lateral surface 140 of the right panel 100.

Figure 4A:
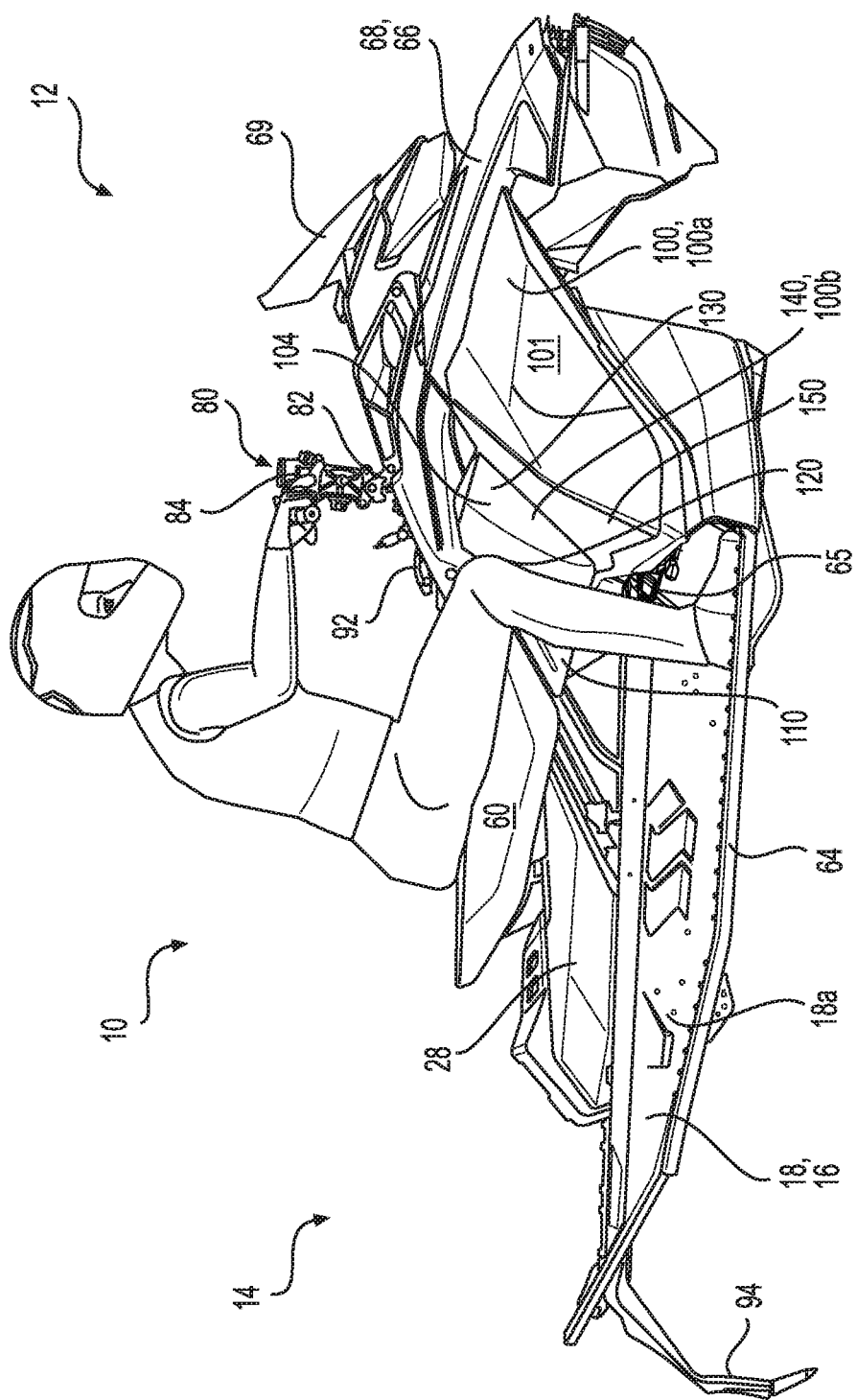
FIG. 4A is a right side elevation view of a portion of the snowmobile of FIG. 1 with a rider seated thereon in an upright riding position and the vehicle steered straight ahead.

With reference to FIG. 4A, when the driver is seated on the snowmobile 10 in an upright position with the snowmobile 10 steered straight ahead as seen in FIG. 4A, the driver's right leg below the knee is intended to be disposed in the rear right leg area 102 (indicated in FIG. 2A) with the inner surface of the right leg abutting the rear longitudinal surface 110 and the front surface of the right leg being disposed adjacent (proximate or abutting) the rear lateral surface 120. The width of the rear lateral surface 120 is large enough to prevent the front surface of the driver's leg from sliding forward inadvertently. The rear longitudinal surface 110 abutting the inside of the driver's leg provides stability to the driver while riding the snowmobile 10. In this upright position, the driver's right knee is disposed generally longitudinally aligned with the right foot resting on the right footrest 64. Similarly, although not shown, the driver's left leg below the knee is intended to be disposed in the rear left leg area 102 defined by the left panel 100 with the inner surface of the left leg being disposed abutting the rear longitudinal surface 110 and the front surface of the left leg disposed adjacent the rear lateral surface 120. The driver's left knee is disposed generally longitudinally aligned with the left foot resting on the left footrest 64.

Figure 4B:
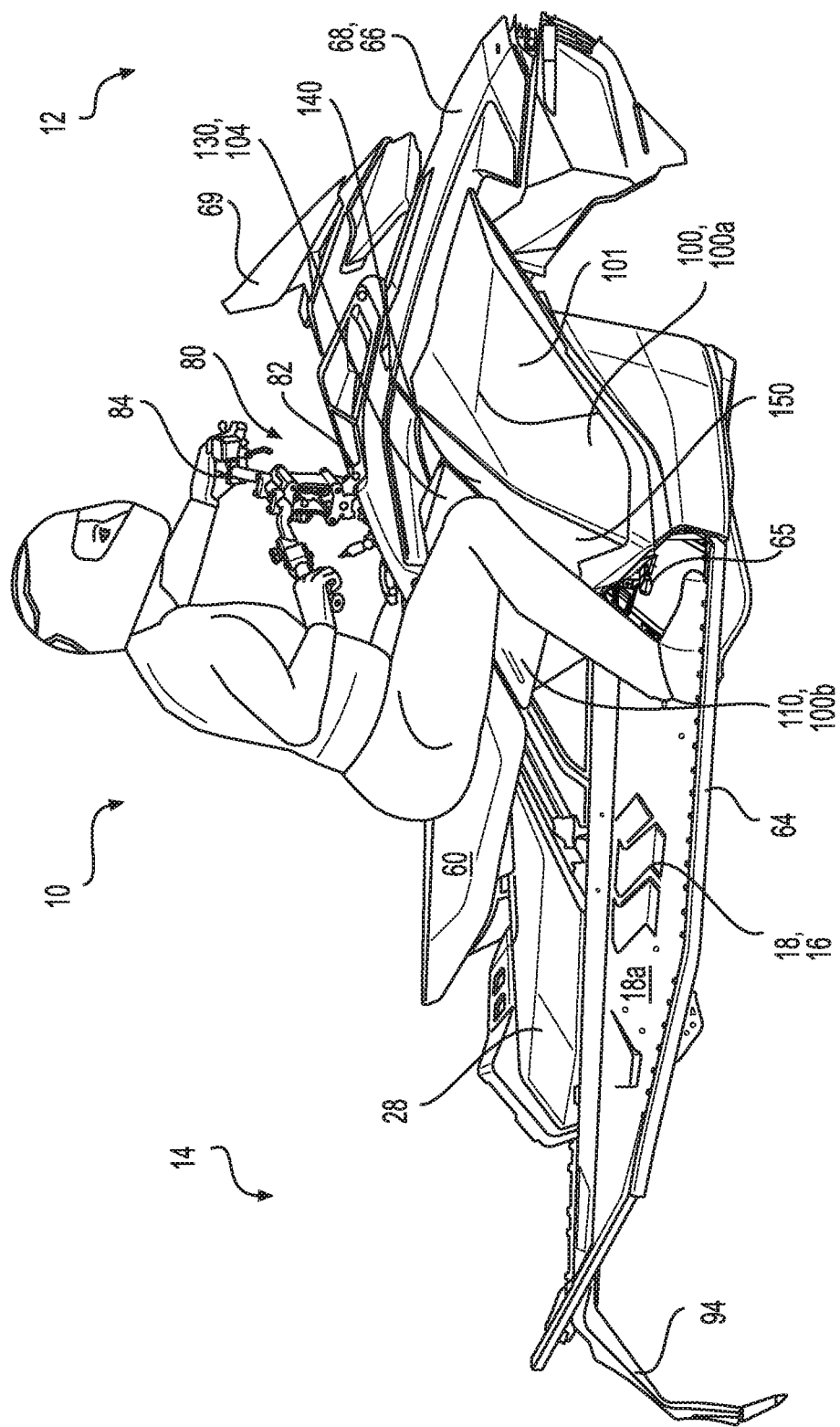
FIG. 4B is a right side elevation view of the snowmobile portion and rider of FIG. 4A with the rider seated thereon in a rightward leaning position with the vehicle turning towards the right.
Figure 4C:
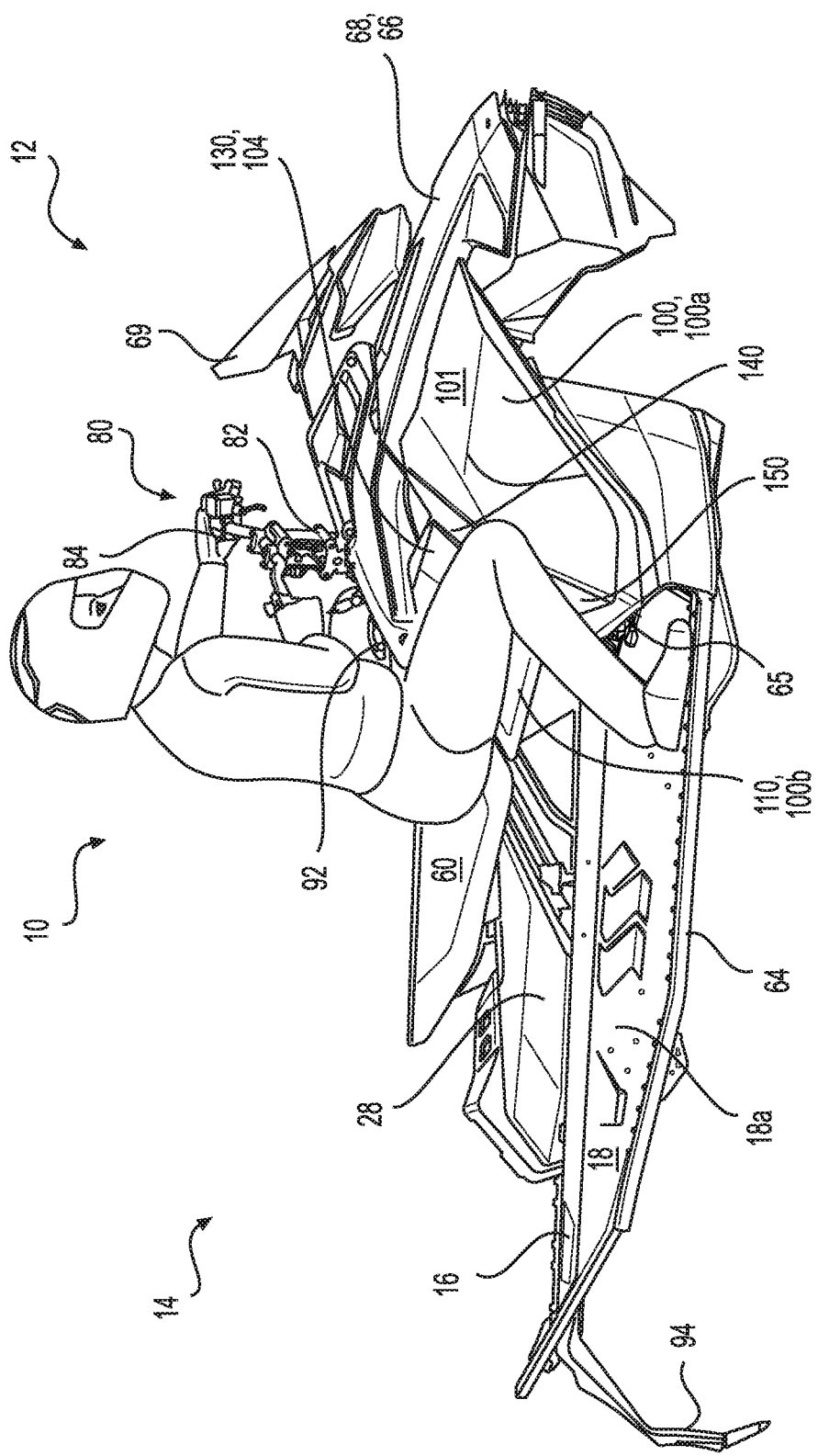
FIG. 4C is a right side elevation view of the snowmobile portion and rider of FIG. 4A with the rider seated thereon in an aggressive rightward leaning position with the vehicle aggressively turning towards the right.
Figure 4D:
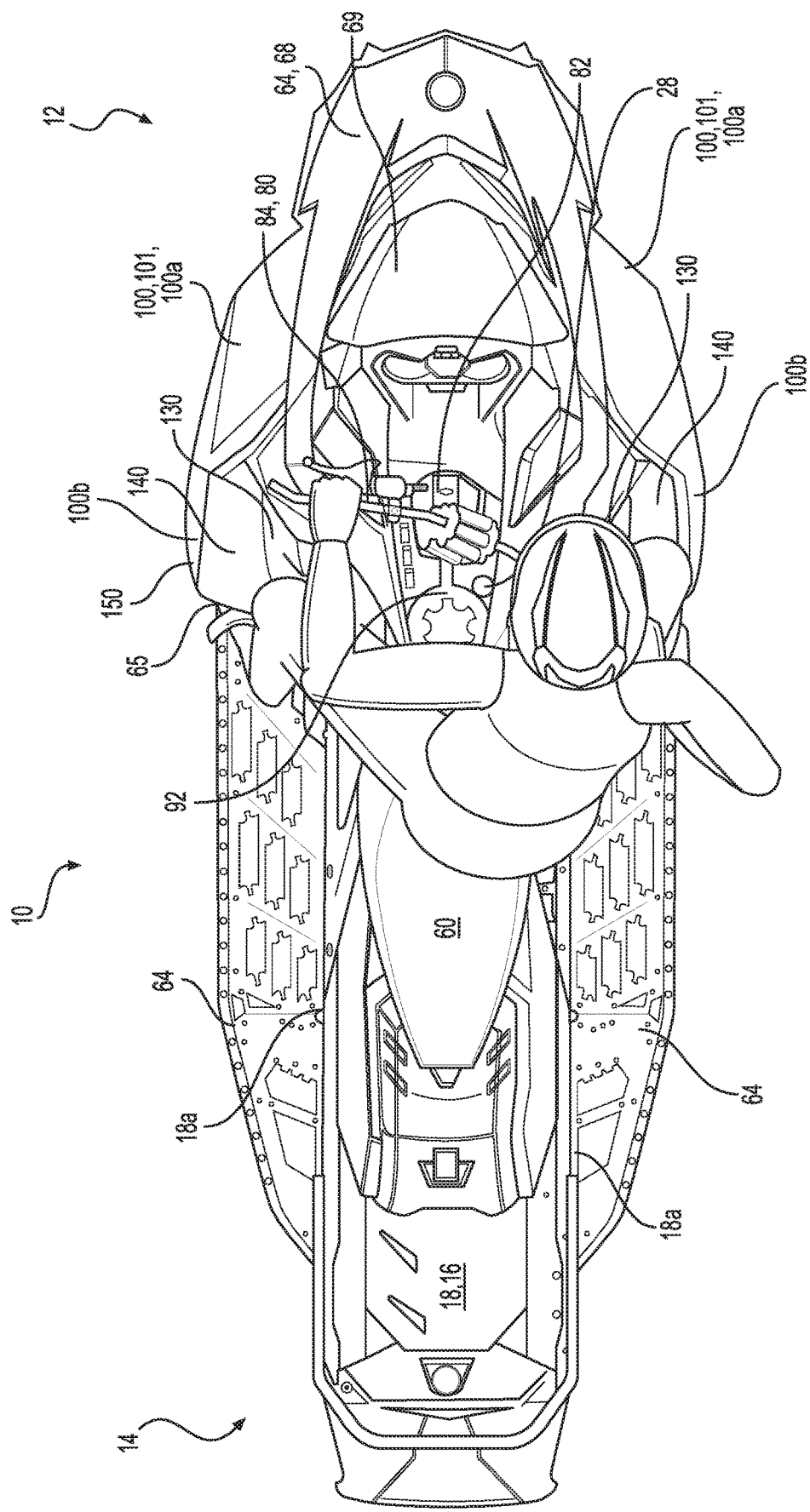
FIG. 4D is a top plan view of the snowmobile portion and rider of FIG. 4B.

With reference to FIGS. 4B and 4D, the driver leans forward and towards the right side of the snowmobile 10 while making a right turn with the snowmobile 10. In this rightward leaning position, the driver's knee and right leg below the knee is intended to be disposed in the front leg area 104. When the driver is in this rightward leaning position shown in FIG. 4B, the driver's right knee is disposed longitudinally forward of the driver's right foot such that the driver's right shin forms a smaller angle with the driver's foot than when in the upright position of FIG. 4A. As can be seen in FIG. 4D, in this rightward leaning position, the driver's left foot is intended to be slightly turned so that the front of the left foot is positioned near the left edge of the left footrest 64 while the back of the driver's left foot is disposed generally along the lateral center of the left footrest 64. The inside of the driver's right leg presses against the front longitudinal surface 130 and the front surface of the driver's right leg presses against the front lateral surface 140 for support and stability while the driver is positioned in this rightward leaning position.

Figure 4E:
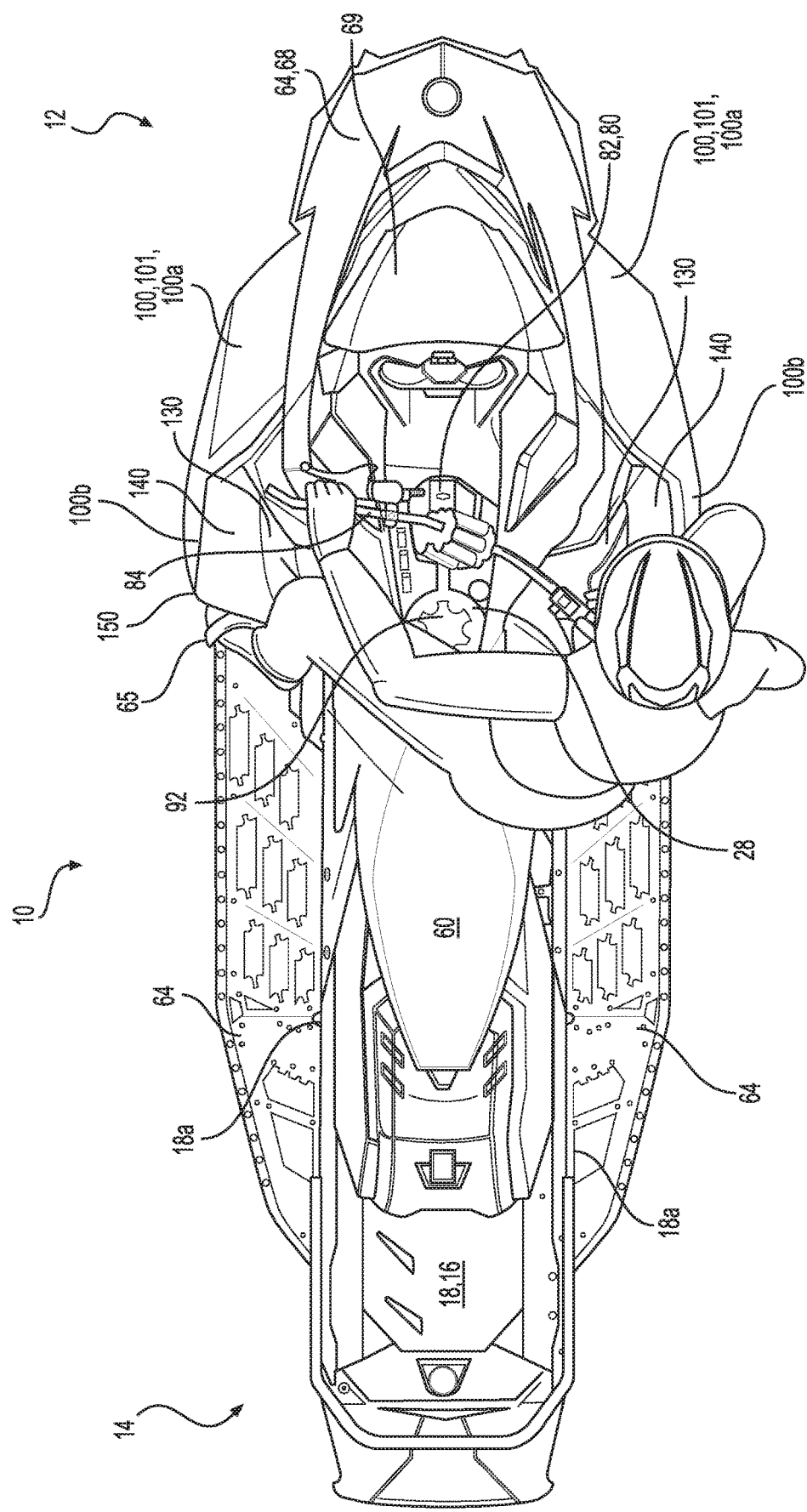
FIG. 4E is a top plan view of the snowmobile portion and rider of FIG. 4C.

With reference to FIGS. 4C and 4E, in some situations, such as while making an aggressive right turn with the snowmobile 10, the driver leans further rightwardly and forwardly than in the position shown in FIG. 4B. In this context, aggressive right turn could refer to turning while driving at a greater speed or executing a sharper turn than in FIG. 4B. The aggressive leaning position shown in FIG. 4C is however not to be limited with respect to any particular vehicle speed or curvature of turn, but rather defined with respect to the driver's position on the snowmobile 10 regardless of the vehicle operating condition in which the driver is thus positioned. In this aggressive rightward leaning position, the driver bends the right leg such that the right knee is disposed even further forward of the right foot than in the position shown in FIG. 4B. When the driver is in this aggressive rightward leaning position shown in FIG. 4C, the driver's right shin forms a smaller angle with the driver's foot than when in the upright position of FIG. 4A or the leaning position of FIG. 4B. In this aggressive rightward leaning position, the inside of the driver's right leg above the foot presses against the front outer surface 150 for support as can be seen in FIG. 4C. As can be seen in FIG. 4E, the driver's torso is supported near the right edge of the seat 60 and the driver's left foot is disposed pointing laterally outwardly when the driver is in the aggressive rightward leaning position of FIGS. 4C and 4E while making an aggressive right turn. The rear portion of the driver's left foot is resting near the left side tunnel surface 18a on the left footrest 64 while the front portion of the driver's left foot is disposed near the left edge of the left footrest 64. The outwardly oriented positioning of the driver's left foot serves to reduce stress on the driver's left knee compared to a position where the driver's left foot is pointing forwardly.

As will be understood, when the driver is steering the snowmobile 10 towards the left, the driver's position on the snowmobile 10 will generally be a mirror image of that described above with respect to FIGS. 4B, 4C and 4D.

The above describes the intended positioning of the driver's legs with respect to the side panels 100 and the snowmobile 10. The shape of the panel 100 described above is intended to facilitate the positioning of the driver as described above. It should however be understood that the driver of the snowmobile 10 may choose to position one or both legs differently than the intended positioning described above.

Figure 6:
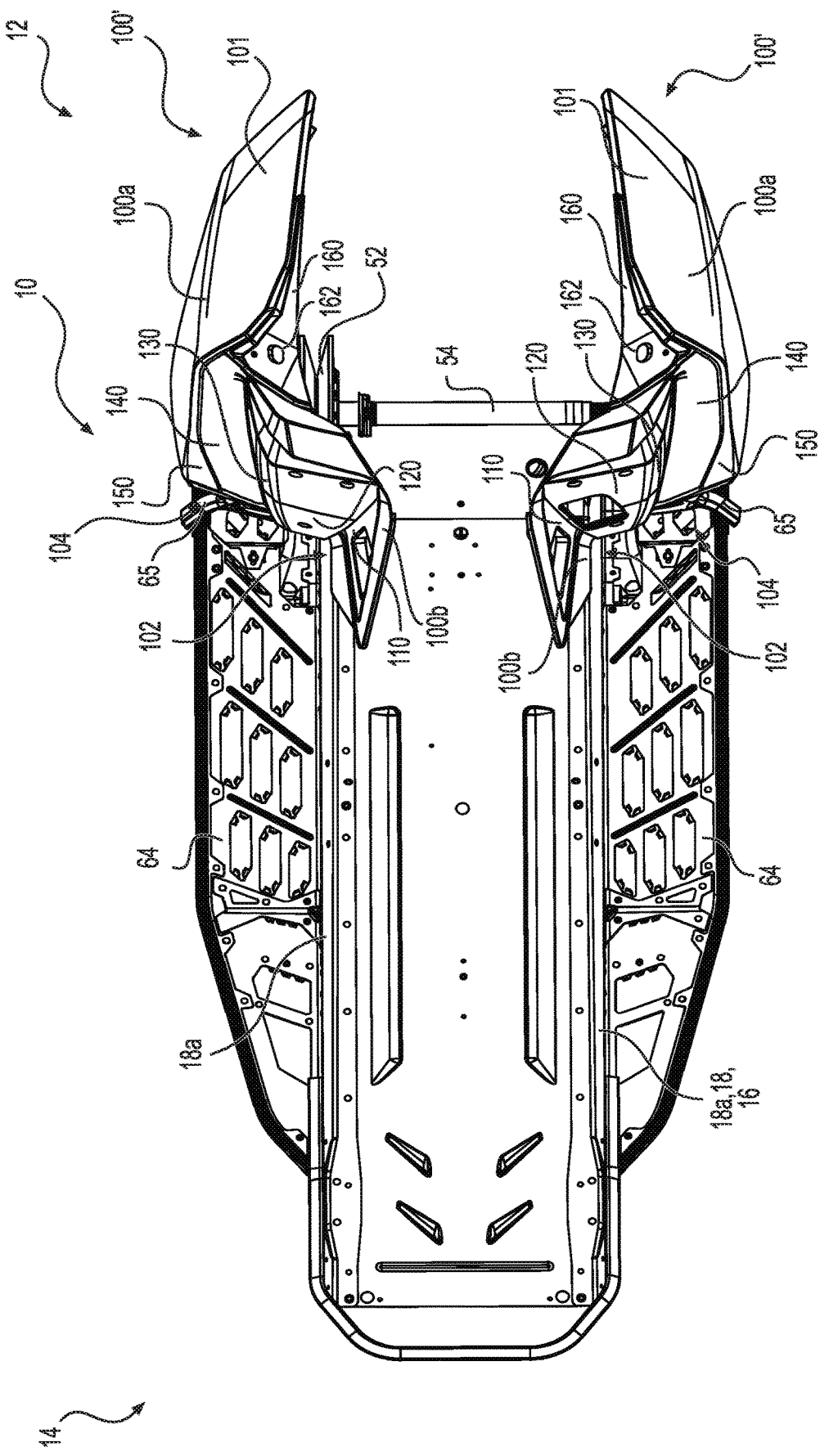
FIG. 6 is a top plan view of the tunnel and driven pulley of FIG. 2B with a right and left side panel according to another implementation being mounted thereto.
Figure 7B:
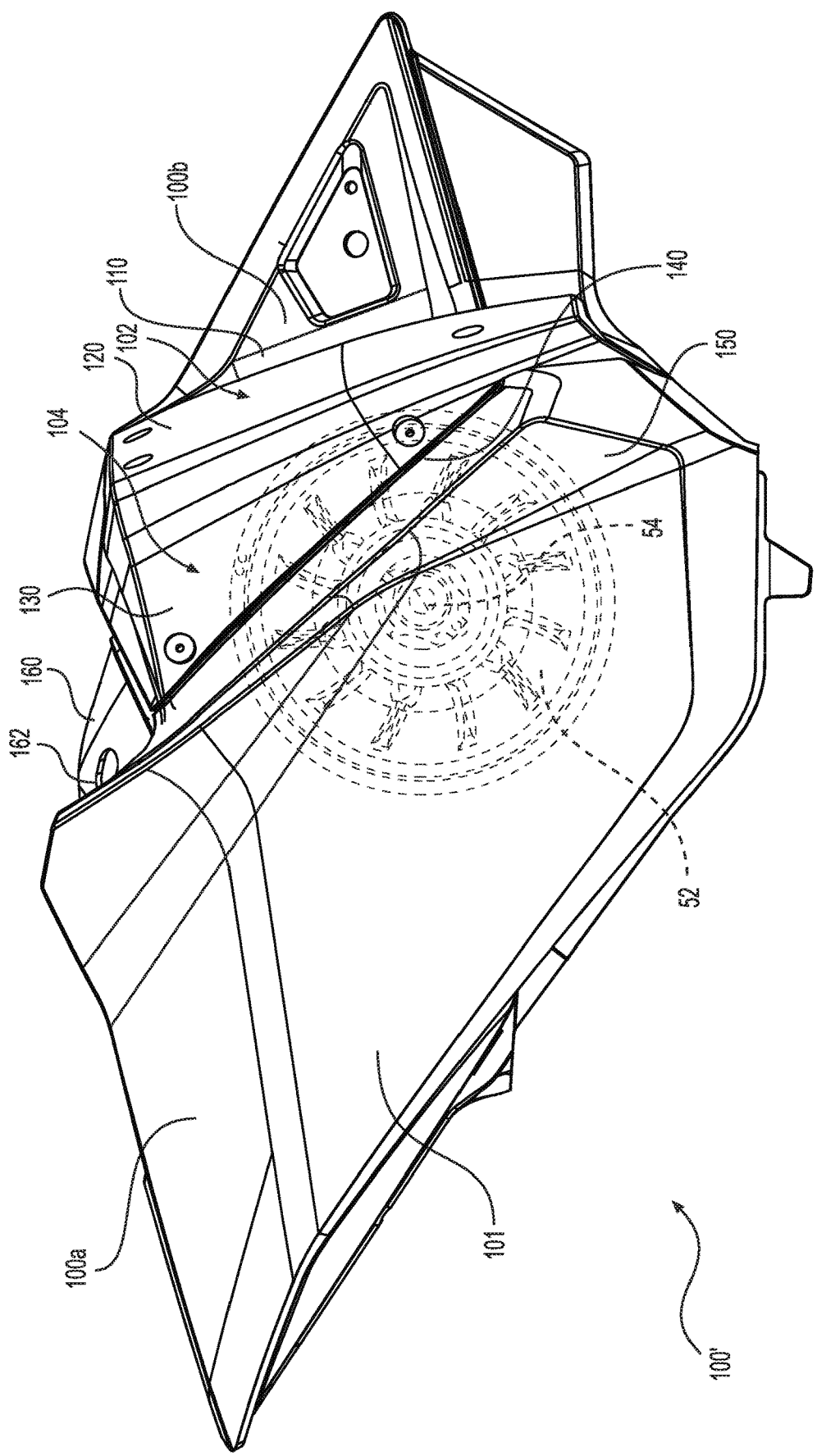
FIG. 7B is a left side elevation view of the left side panel, the driven pulley and countershaft of FIG. 7A.

With reference to FIGS. 6 to 7B, another implementation of left and right side panels 100' of the snowmobile 10 will now be discussed. The right side panel 100' is similar to the right side panel 100 described above. As such, features of the right side panel 100' corresponding to features of the right side panel 100 have been labelled with the same reference numbers and will only be discussed herein with respect to the differences. The left side panel 100' is nearly a mirror image of the right side panel 100' and as such corresponding features of the left and right panels 100' have been labeled with the same reference numbers.

In the right side panel 100', the rear lateral surface 120 is more upright (forms a smaller angle with a vertical plane extending laterally) than the rear lateral surface 120 of the right side panel 100. In the right side panel 100', the rear lateral surface 120 is also wider than the rear lateral surface 120 of the right side panel 100 as can be seen by comparing FIGS. 2B and 6. In the right side panel 100, the front longitudinal surface 130 therefore curves forwardly more gently than the front longitudinal surface 130 in the right side panel 100'.

Figure 8A:
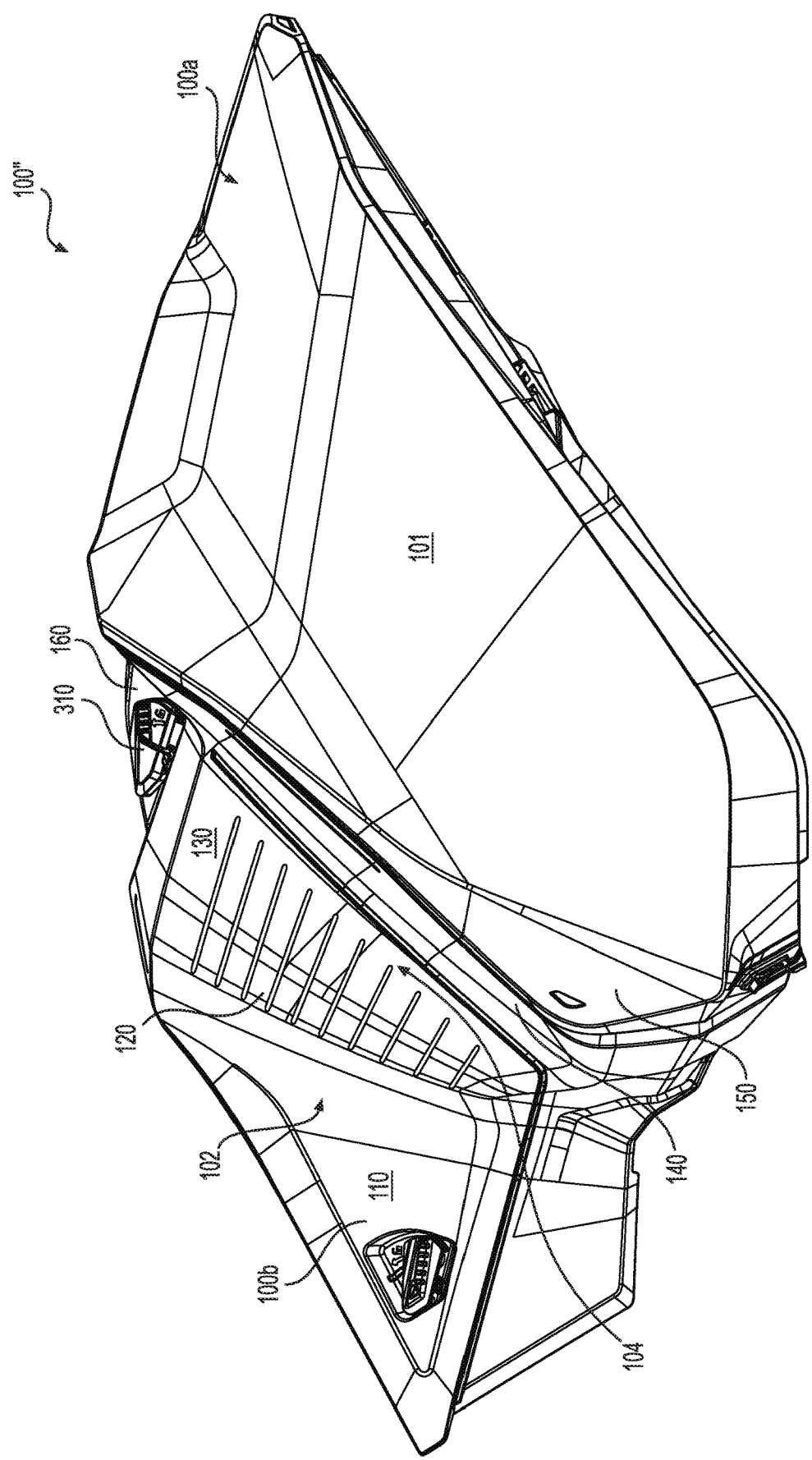
FIG. 8A is a right side elevation view of another implementation of a right side panel similar to that of FIG. 6.
Figure 8B:
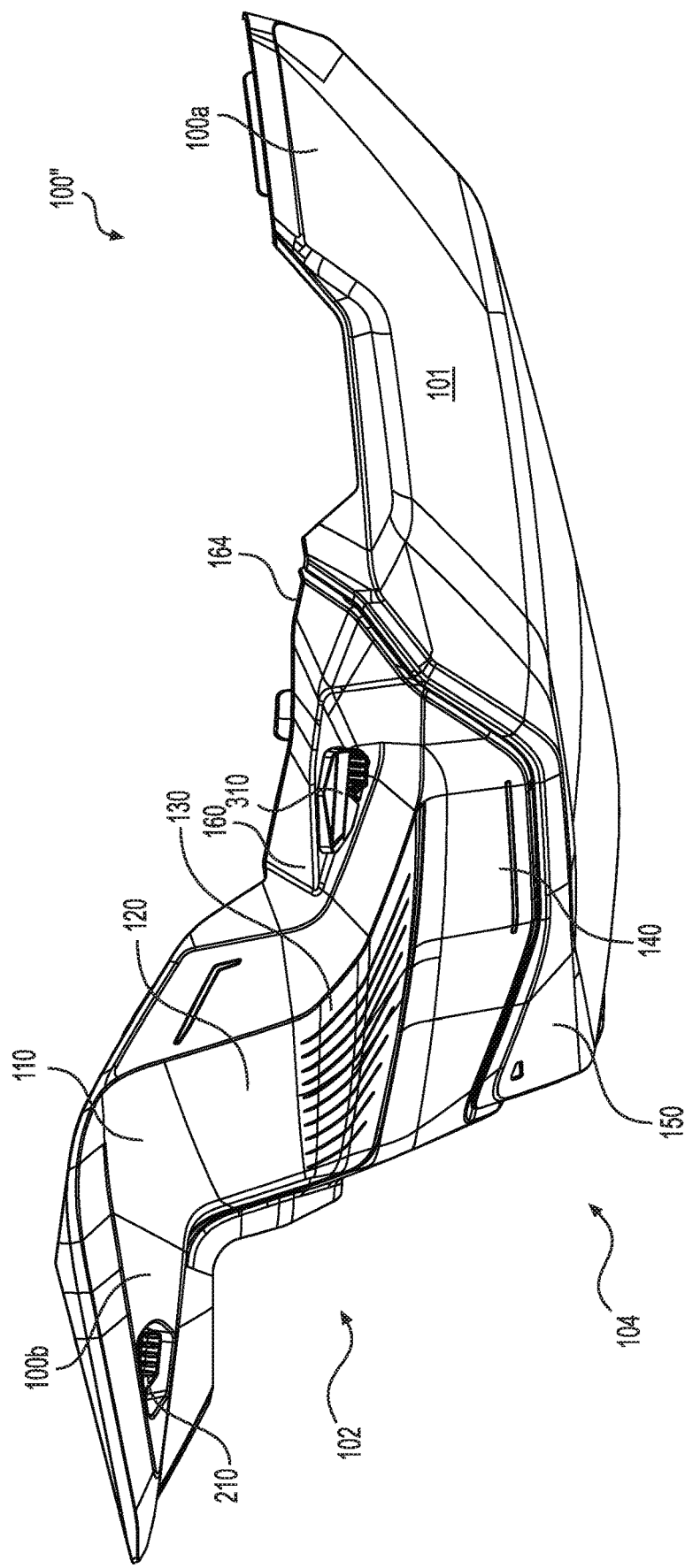
FIG. 8B is a top plan view of the right side panel of FIG. 8A.

With reference to FIGS. 8A and 8B, yet another implementation of a right side panel 100" of the snowmobile 10 is shown. The right side panel 100" is similar to the right side panel 100' described above. As such, features of the right side panel 100" corresponding to features of the right side panel 100' have been labelled with the same reference numbers and will only be discussed herein with respect to the differences. Although not shown, a left side panel is nearly a mirror image of the right side panel 100" and as such will not be discussed herein.

The right side panel 100" is different from the right side panel 100' in the inner portion 160 disposed forward of the front longitudinal surface 130 and the rear lateral surface 120 as can be seen by comparing FIGS. 6 and 8B. Additionally, the front longitudinal surface 130 and the rear lateral surface 120 include horizontal ridges. The right side panel 100" further includes a rear latch 210 and a top latch 310 for removably connecting the right side panel 100" to the frame 16. The latch 210 can be seen in more detail in FIGS. 9A to 10B; the latch 310 includes similar features and as such will not be described herein.

Figure 9B:
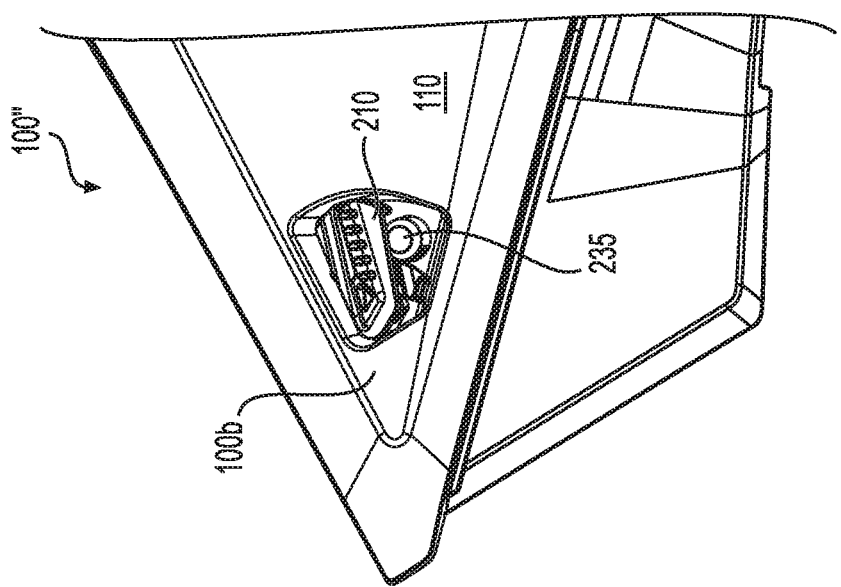
FIG. 9B is a partial view of the right side panel of FIG. 8A, with the latch in an opened position.
Figure 9A:
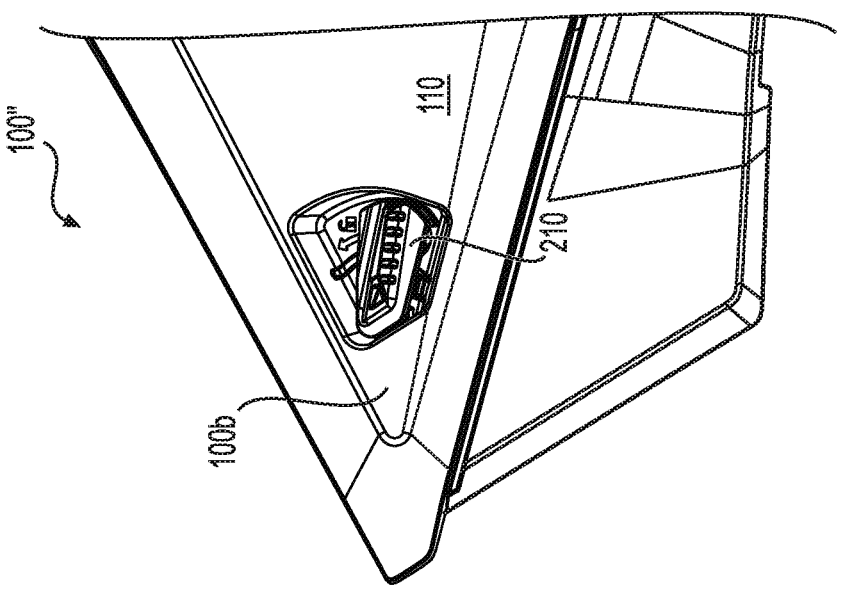
FIG. 9A is a partial view of the right side panel of FIG. 8A, with a latch in a closed position.

FIG. 9A illustrates the latch 210 in a closed position, the latch 210 connecting the right side panel 100" to the frame 16. When the latch 210 is opened by turning a latch handle 260, as illustrated in FIG. 9B, the right side panel 100" can be removed from the frame 16. To remove the right side panel 100", both latches 210, 310 are rotated to their open positions and the right side panel 100" is pivoted away from the frame 16 of the snowmobile 10.

Figure 10B:
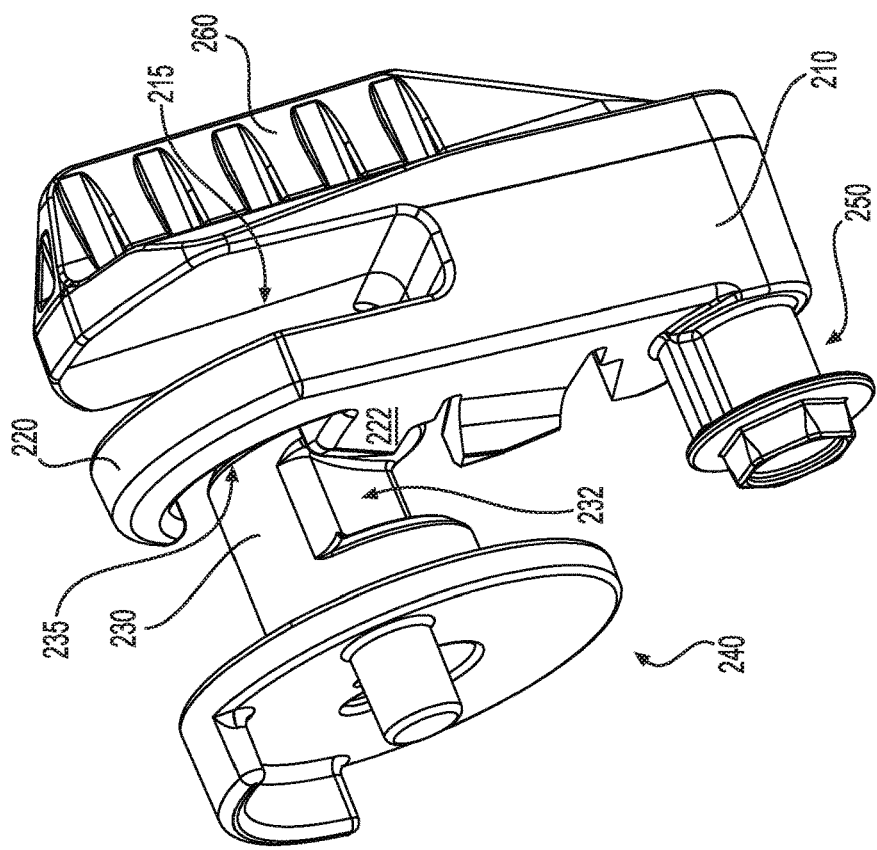
FIG. 10B is a rear, left side perspective view of the latch assembly of the right side panel of FIG. 8A, with the latch in the opened position.
Figure 10A:
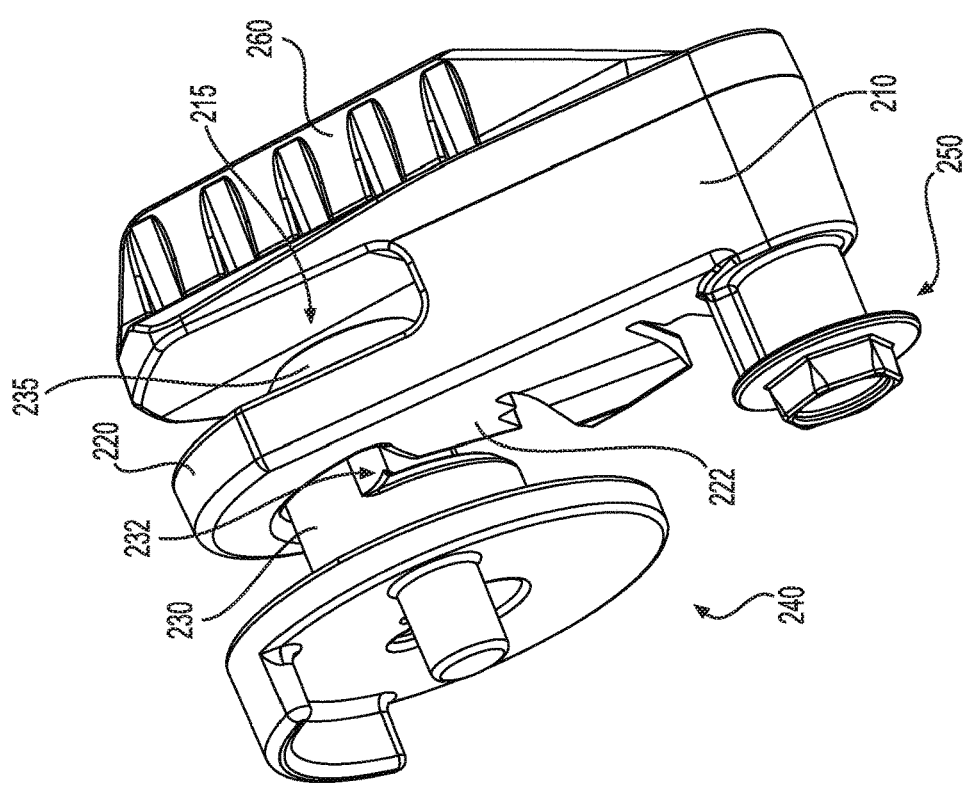
FIG. 10A is a rear, left side perspective view of a latch assembly of the right side panel of FIG. 8A, with the latch in the closed position.
Figure 11:
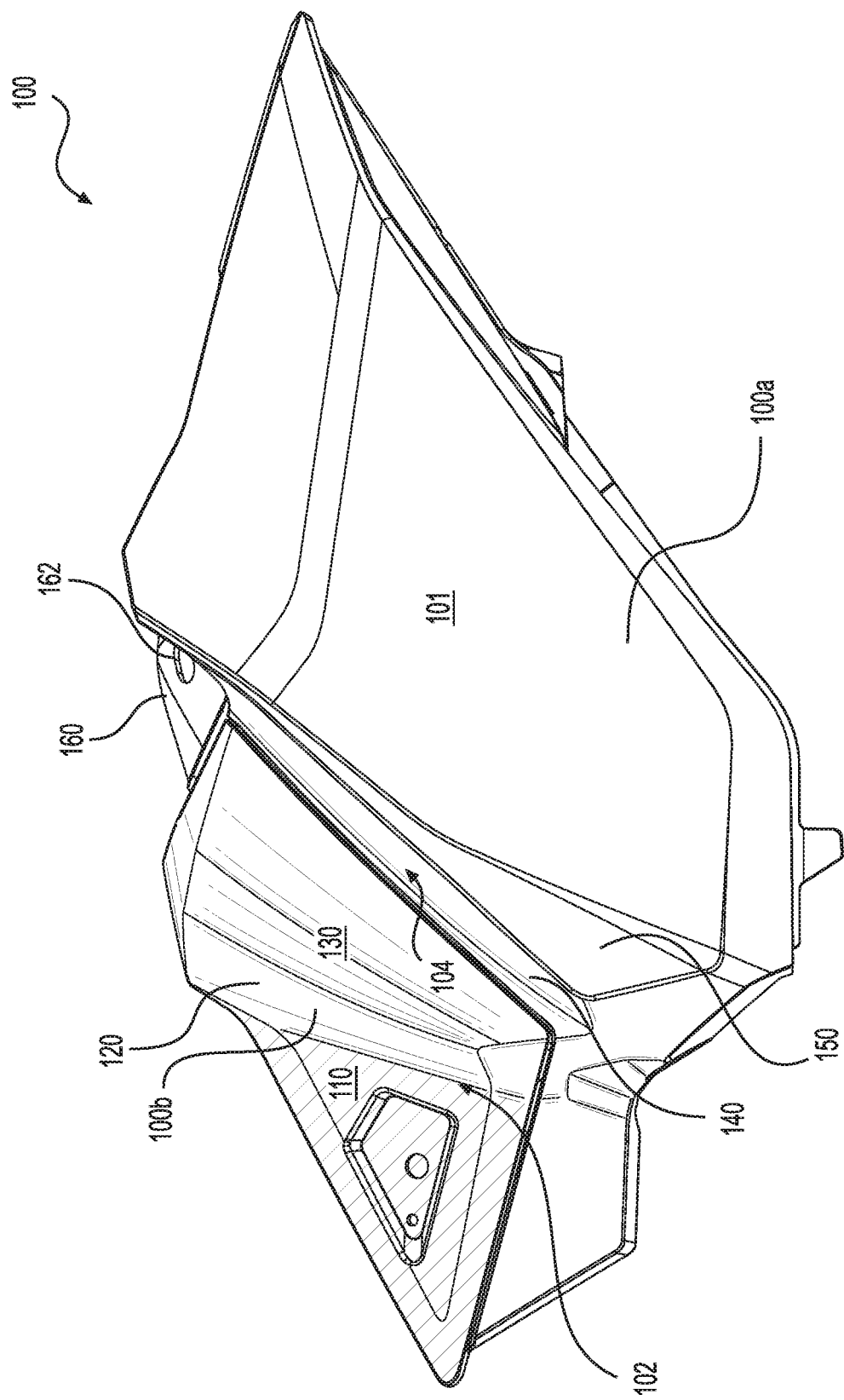
FIG. 11 is a right side elevation view of the right side panel of FIG. 3A with the rear longitudinal surface thereof being indicated in hatched lines.
Figure 12:
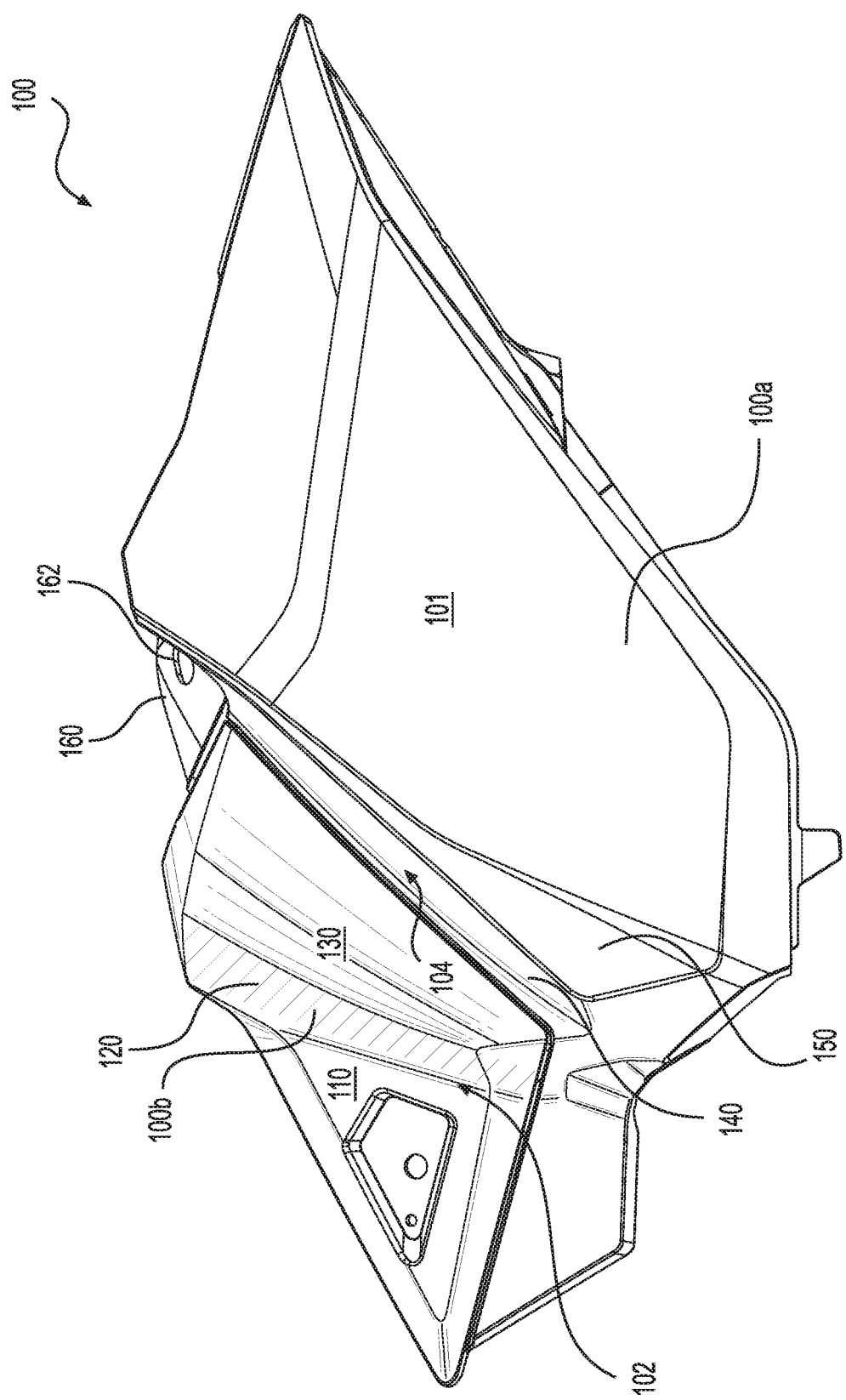
FIG. 12 is a right side elevation view of the right side panel of FIG. 3A with the rear lateral surface thereof being indicated in hatched lines.
Figure 13:
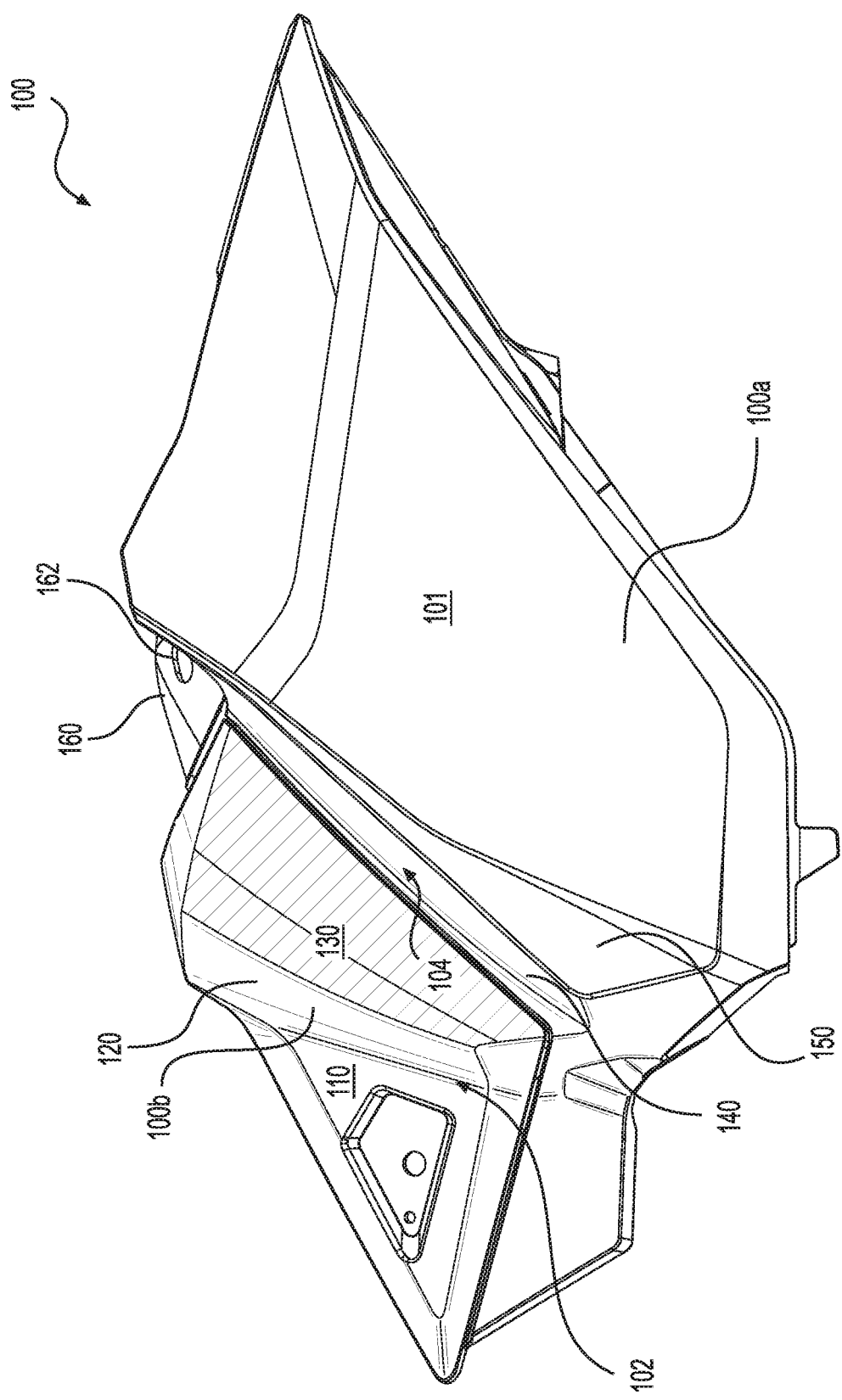
FIG. 13 is a right side elevation view of the right side panel of FIG. 3A with the front longitudinal surface thereof being indicated in hatched lines.
Figure 14:
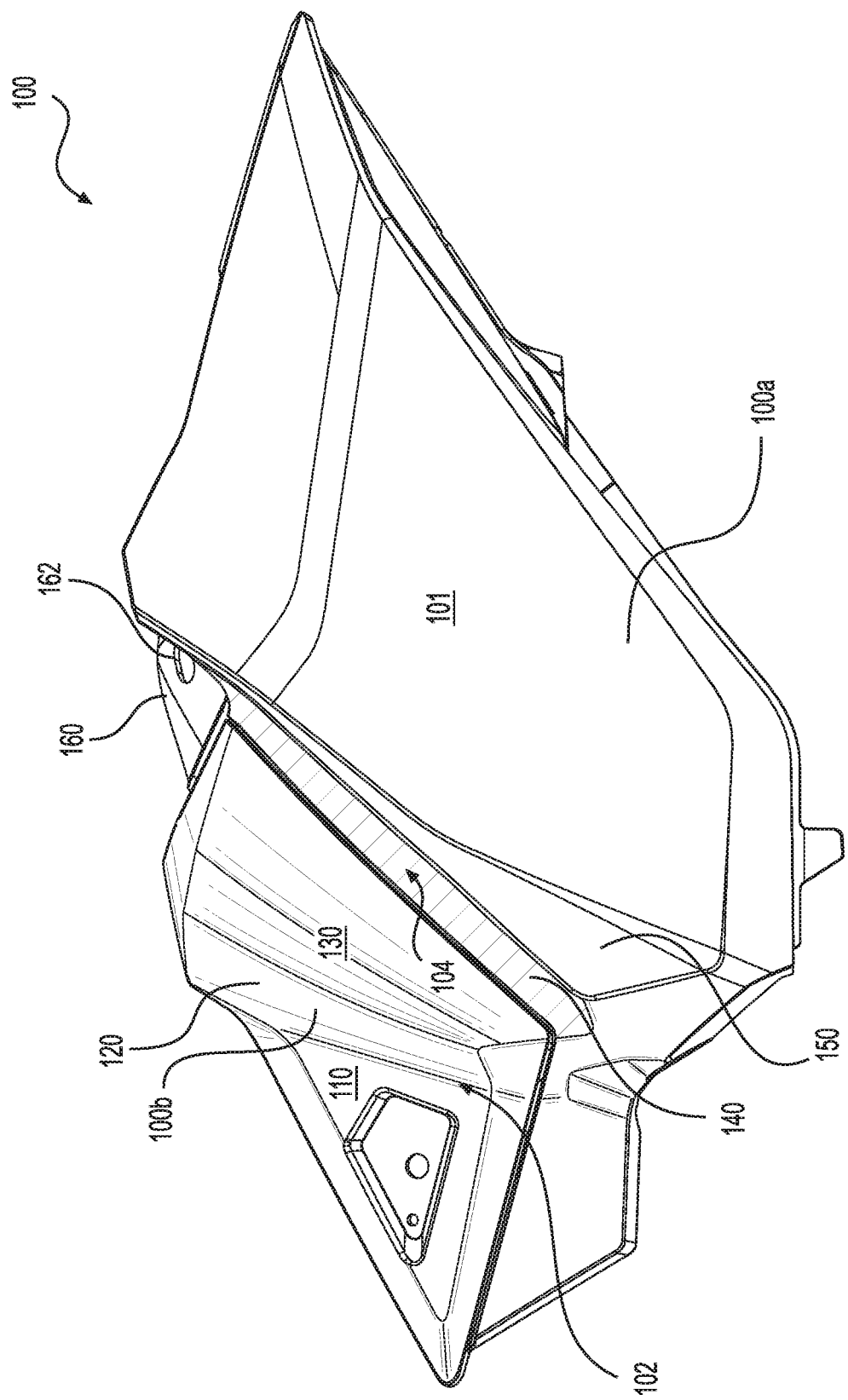
FIG. 14 is a right side elevation view of the right side panel of FIG. 3A with the front lateral surface thereof being indicated in hatched lines.
Figure 15:
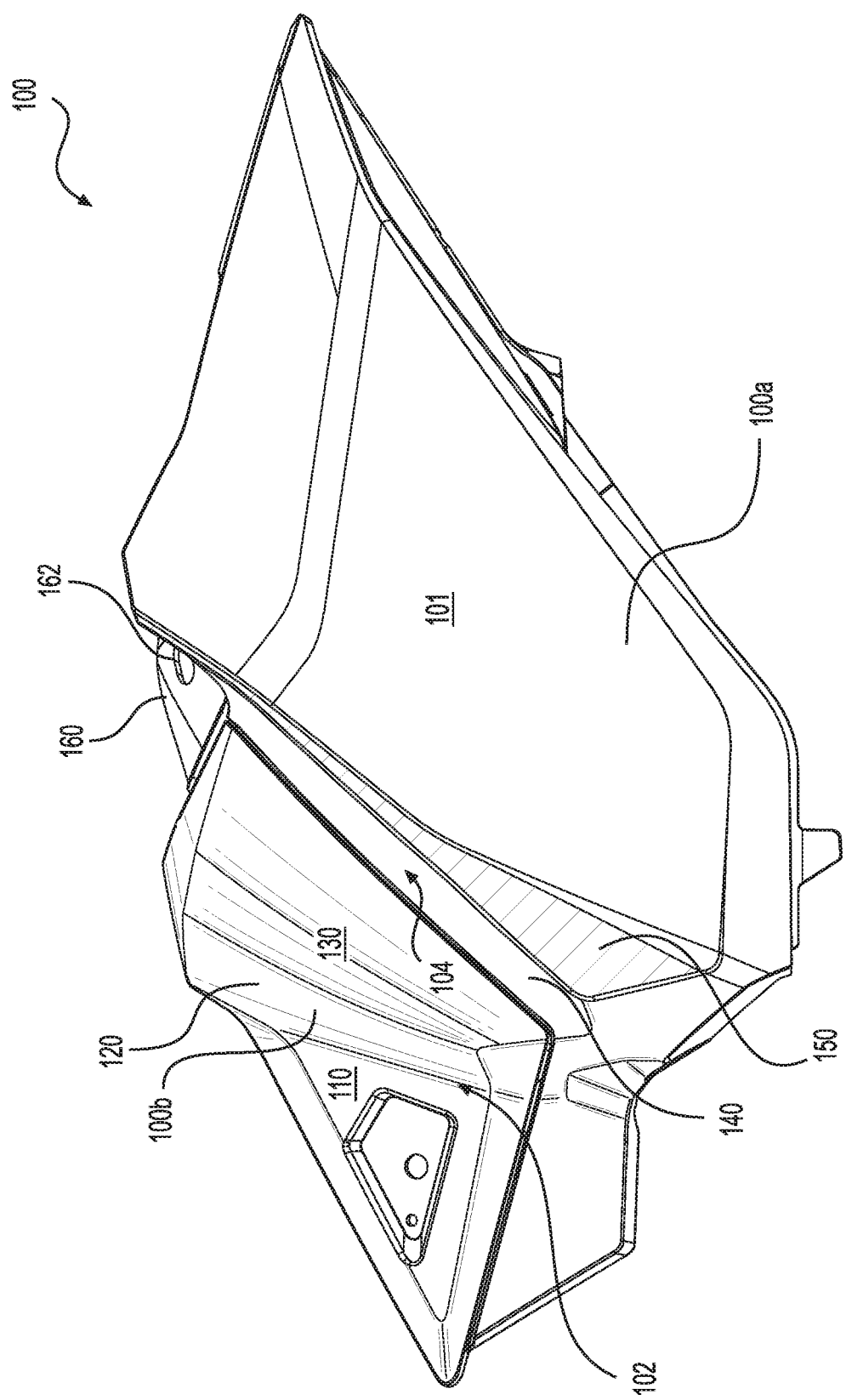
FIG. 15 is a right side elevation view of the right side panel of FIG. 3A with the front outer surface thereof being indicated in hatched lines.

The latch 210 is shown in FIGS. 10A and 10B removed from the right side panel 100", along with a pin 230 about which the latch 210 connects. The latch 210 is pivotably connected to the right side panel 100" by a bolt 250.

The pin 230 has an inner portion 240 which connects to the frame 16. The inner portion 240 is bolted to the frame 16, but it is contemplated that the pin 230 could be connected to the frame by other means. The pin 230 could be welded or glued to the frame 16, for example, or the pin 230 could be integral to the frame 16.

The pin 230 has an outer portion 235 which passes through the right side panel 100" (see also FIG. 9B). The latch 210 includes a hook section 220 and an adjacent stopper portion 222. When the latch 210 is rotated to a closed position, the hook section 220 hooks around the pin 230, with the outer portion 235 of the pin 230 passing into a passage 215 in the latch 210.

The pin 230 includes a notch 232 generally aligned with the hook section 220 of the latch 210 which receives the stopper portion 222 when the latch 210 is in the closed position. The stopper portion 222, as disposed in the notch 232, helps prevent the latch 210 and the right side panel 100" from pivoting generally away from the frame 16.

It is contemplated that the right side panel 100', 100" could be fastened to the frame 16 of the snowmobile 10 via another panel of the fairings 66, via another component of the snowmobile 10, or directly to the frame 16.

Modifications and improvements to the above-described implementations of the present may become apparent to those skilled in the art. The foregoing description is intended to be exemplary rather than limiting. The scope of the present is therefore intended to be limited solely by the scope of the appended claims.

What is claimed is:

1. A vehicle comprising:
   a frame;
   a motor operatively connected to the frame;
   a ground engaging member operatively connected to the motor and the frame, the ground engaging member being one of: an endless track, and a wheel;
   a driven pulley operatively connecting the motor to the ground engaging member;
   a straddle seat connected to the frame and configured to accommodate at least a driver of the vehicle; and
   a left side panel connected on a left side of the frame and a right side panel connected on a right side of the frame, each of the left and right side panels being disposed at least in part longitudinally forward of and vertically lower than the straddle seat,
      the left side panel defining a space for receiving the driven pulley therein, the left side panel defining a rear left leg area and a front left leg area disposed longitudinally forward of the rear left leg area, the rear left leg area selectively accommodating a portion of a left leg of the driver in a first left leg position and the front left leg area selectively accommodating a portion of the left leg of the driver in a second left leg position, the left side panel comprising:
         a front longitudinal surface extending generally longitudinally on an exterior side of the driven pulley,
         a rear lateral surface extending generally upwardly and forwardly from behind the driven pulley to above the driven pulley, the front longitudinal surface and the rear lateral surface defining the space for receiving the driven pulley therein, the rear left leg area being defined in part by the rear lateral surface such that the rear left leg area is rearward of the driven pulley, and
         a front lateral surface extending laterally outwardly of the front longitudinal surface, the front lateral surface joining with a lower edge of the front longitudinal surface, the front left leg area being defined in part by the front lateral surface such that the front left leg area is to the left of and at least partially in front of a rearward-most part of the driven pulley.

2. The vehicle of claim 1, wherein the left side panel further comprises an inner portion disposed generally above the driven pulley.

3. The vehicle of claim 1, wherein the left side panel further comprises a rear longitudinal surface extending generally rearward from the rear lateral surface.

4. The vehicle of claim 1, wherein the left side panel further comprises a front outer surface extending longitudinally from the front lateral surface.

5. The vehicle of claim 4, wherein the front longitudinal surface and the front outer surface overlap at least a portion of the driven pulley in a side view of the vehicle.

6. The vehicle of claim 5, wherein the front lateral surface extends laterally and forwardly from the front longitudinal surface such that the front lateral surface overlaps a portion of the driven pulley in the side view of the vehicle.

7. The vehicle of claim 6, wherein:
   the front longitudinal surface and the front outer surface extend in both the lateral direction and the longitudinal direction; and
   the front longitudinal surface and the front outer surface extend further in the longitudinal direction than in the lateral direction.

8. The vehicle of claim 7, wherein:
   the front lateral surface and the rear lateral surface extend in both the lateral direction and the longitudinal direction; and
   the front and rear lateral surfaces extend further in the lateral direction than in the longitudinal direction.

9. A vehicle comprising:
   a frame;
   a motor operatively connected to the frame;
   a ground engaging member operatively connected to the motor and the frame, the ground engaging member being one of: an endless track, and a wheel;
   a driven pulley operatively connecting the motor to the ground engaging member;
   a straddle seat connected to the frame and configured to accommodate at least a driver of the vehicle; and
   a left side panel connected on a left side of the frame and a right side panel connected on a right side of the frame, each of the left and right side panels being disposed at least in part longitudinally forward of and vertically lower than the straddle seat,
      at least one of the left side panel and the right side panel defining a space for receiving the driven pulley therein, the at least one of the left side panel and the right side panel comprising:
         a front longitudinal surface extending generally longitudinally on an exterior side of the driven pulley,
         a rear lateral surface extending generally upwardly and forwardly from behind the driven pulley to above the driven pulley, the front longitudinal surface and the rear lateral surface defining the space for receiving the driven pulley therein,
         a front lateral surface extending laterally outwardly of the front longitudinal surface, the front lateral surface joining with a lower edge of the front longitudinal surface, and a front outer surface extending longitudinally from the front lateral surface, the front longitudinal surface and the front outer surface overlapping at least a portion of the driven pulley in a side view of the vehicle.

10. The vehicle of claim 9, wherein the at least one of the left side panel and the right side panel further comprises an inner portion disposed generally above the driven pulley.

11. The vehicle of claim 9, wherein the at least one of the left side panel and the right side panel further comprises a rear longitudinal surface extending generally rearward from the rear lateral surface.

12. The vehicle of claim 9, wherein:

the at least one of the left side panel and the right side panel is the left side panel; and the left side panel further defines a rear left leg area and a front left leg area disposed longitudinally forward of the rear left leg area, the rear left leg area selectively accommodating a portion of a left leg of the driver in a first left leg position and the front left leg area selectively accommodating a portion of the left leg of the driver in a second left leg position.

13. The vehicle of claim 9, wherein the front lateral surface extends laterally and forwardly from the front longitudinal surface such that the front lateral surface overlaps a portion of the driven pulley in the side view of the vehicle.

14. The vehicle of claim 13, wherein:

the front longitudinal surface and the front outer surface extend in both the lateral direction and the longitudinal direction; and the front longitudinal surface and the front outer surface extend further in the longitudinal direction than in the lateral direction.

15. The vehicle of claim 14, wherein:

the front lateral surface and the rear lateral surface extend in both the lateral direction and the longitudinal direction; and the front and rear lateral surfaces extend further in the lateral direction than in the longitudinal direction.

* * * * *